US011794766B2

(12) United States Patent
Khan et al.

(10) Patent No.: US 11,794,766 B2
(45) Date of Patent: Oct. 24, 2023

(54) SYSTEMS AND METHODS FOR PREDICTION-BASED DRIVER ASSISTANCE

(71) Applicants: Taslim Arefin Khan, Scarborough (CA); Szu Wen Fan, Markham (CA); Wei Li, Markham (CA)

(72) Inventors: Taslim Arefin Khan, Scarborough (CA); Szu Wen Fan, Markham (CA); Wei Li, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 69 days.

(21) Appl. No.: 17/501,915

(22) Filed: Oct. 14, 2021

(65) Prior Publication Data

US 2023/0121388 A1    Apr. 20, 2023

(51) Int. Cl.
*B60W 50/14*    (2020.01)
*B60W 50/00*    (2006.01)
(Continued)

(52) U.S. Cl.
CPC ............ *B60W 50/14* (2013.01); *B60K 35/00* (2013.01); *B60W 30/0956* (2013.01); *B60W 40/105* (2013.01); *B60W 50/0097* (2013.01); *B60K 2370/1529* (2019.05); *B60K 2370/177* (2019.05); *B60K 2370/178* (2019.05); *B60W 2050/146* (2013.01); *B60W 2520/14* (2013.01);
(Continued)

(58) Field of Classification Search
CPC ............ B60W 50/14; B60W 30/0956; B60W 40/105; B60W 50/0097; B60W 2554/802; B60W 2554/40; B60W 2050/146; B60W 2520/14; B60W 2540/18; B60K 35/00; B60K 2370/1529; B60K 2370/177; B60K 2370/178
See application file for complete search history.

(56) References Cited

U.S. PATENT DOCUMENTS 8,818,610 B1 *    8/2014    Szybalski ............. B60W 30/16
                                                701/28
9,403,436 B1 *    8/2016    Yamada ................ B60K 35/00
(Continued)

FOREIGN PATENT DOCUMENTS

CN         105679091 A      6/2016
CN         111231965 A      6/2020
(Continued)

OTHER PUBLICATIONS

User-Centered Perspectives for Automotive Augmented Reality, Victor Ng-Thow-Hing et al., Published Oct. 1-4, 2013 Oct. 4, 2013.

*Primary Examiner* — Chico A Foxx

(57) ABSTRACT

The present disclosure describes systems and methods for providing driver assistance. A current vehicle state of a vehicle at a current timestep and an environment map representing an environment of the vehicle at least at the current timestep are obtained. Augmented reality feedback is generated including a virtual vehicle representing a predicted future vehicle state, where the predicted future vehicle state is predicted for a given future timestep based on at least one of the current vehicle state or the current environment. The generated augmented reality feedback including the virtual vehicle is outputted to be displayed by a display device.

24 Claims, 14 Drawing Sheets

(51) Int. Cl.
*B60W 30/095* (2012.01)
*B60W 40/105* (2012.01)
*B60K 35/00* (2006.01)

(52) U.S. Cl.
CPC ..... *B60W 2540/18* (2013.01); *B60W 2554/40* (2020.02); *B60W 2554/802* (2020.02)

(56) References Cited

U.S. PATENT DOCUMENTS

| | | | |
|---|---|---|---|
| 9,588,340 B2* | 3/2017 | Ng-Thow-Hing | G08G 1/167 |
| 9,690,104 B2* | 6/2017 | Kim | G02B 27/01 |
| 10,395,433 B2 | 8/2019 | Tomatsu | |
| 10,479,274 B2 | 11/2019 | Park | |
| 10,552,695 B1* | 2/2020 | Bush | G06N 20/00 |
| 10,834,552 B1* | 11/2020 | Saito | G08G 1/096791 |
| 10,857,944 B2* | 12/2020 | Nakasho | B60R 1/00 |
| 11,110,935 B2 | 9/2021 | Ko | |
| 2002/0055808 A1 | 5/2002 | Matsumoto | G01C 21/365 348/148 |
| 2007/0106471 A1* | 5/2007 | Yoshiguchi | B62D 15/029 701/431 |
| 2014/0266656 A1* | 9/2014 | Ng-Thow-Hing | G08G 1/166 340/435 |
| 2015/0210280 A1* | 7/2015 | Agnew | B60W 10/192 701/70 |
| 2016/0052394 A1* | 2/2016 | Yamada | G01C 21/365 701/93 |
| 2016/0155269 A1* | 6/2016 | Cho | B60R 1/00 345/633 |
| 2016/0257199 A1* | 9/2016 | Bark | B60K 35/00 |
| 2017/0076599 A1* | 3/2017 | Gupta | G08G 1/096716 |
| 2017/0103571 A1* | 4/2017 | Beaurepaire | G06F 3/011 |
| 2017/0192091 A1* | 7/2017 | Felix | G06T 19/006 |
| 2017/0276494 A1* | 9/2017 | Kusano | G01C 21/3415 |
| 2017/0361853 A1* | 12/2017 | Nagy | B60W 10/20 |
| 2018/0144549 A1* | 5/2018 | Gonzalez | G02B 27/0101 |
| 2018/0174463 A1* | 6/2018 | Ohta | H04N 23/58 |
| 2018/0259349 A1* | 9/2018 | Kusano | B60W 50/14 |
| 2019/0004538 A1* | 1/2019 | Wood | B62D 15/0265 |
| 2019/0015976 A1* | 1/2019 | Sweeney | G05D 1/0246 |
| 2019/0047472 A1* | 2/2019 | Chaaya | G01S 13/931 |
| 2019/0064824 A1* | 2/2019 | Nix | G05D 1/0212 |
| 2019/0179322 A1* | 6/2019 | Zych | G08G 1/166 |
| 2019/0244515 A1* | 8/2019 | Hacker | G08G 1/167 |
| 2019/0367021 A1 | 12/2019 | Zhao et al. | |
| 2020/0180656 A1* | 6/2020 | Kim | B60W 30/0956 |
| 2020/0189459 A1* | 6/2020 | Bush | G06F 18/2163 |
| 2020/0283016 A1 | 9/2020 | Blaiotta | |
| 2021/0039715 A1* | 2/2021 | Ferrer | H04W 4/46 |
| 2021/0070288 A1* | 3/2021 | Yamaoka | B60W 30/09 |
| 2021/0080955 A1 | 3/2021 | Wilkinson et al. | |
| 2021/0138960 A1* | 5/2021 | Benjamin | B60Q 5/006 |
| 2021/0142526 A1* | 5/2021 | Mantyjarvi | B60W 50/0097 |
| 2021/0215499 A1* | 7/2021 | Kassner | G02B 27/01 |
| 2021/0224560 A1* | 7/2021 | Kim | G08G 1/166 |
| 2021/0233290 A1* | 7/2021 | Shimazu | H04N 23/00 |
| 2021/0276422 A1* | 9/2021 | Masoero | G01C 21/3453 |
| 2021/0276591 A1 | 9/2021 | Urtasun et al. | |
| 2021/0339679 A1* | 11/2021 | Benjamin | B60K 35/00 |
| 2022/0066763 A1* | 3/2022 | Kumar | G06F 9/4451 |
| 2022/0080827 A1* | 3/2022 | Sung | B60W 30/16 |
| 2022/0114988 A1* | 4/2022 | Prakah-Asante | G01C 21/3602 |
| 2022/0262236 A1* | 8/2022 | Ueno | G02B 27/017 |

FOREIGN PATENT DOCUMENTS

| | | | | |
|---|---|---|---|---|
| CN | 112133089 A | 12/2020 | | |
| CN | 112601686 A | 4/2021 | | |
| DE | 102019005891 A1 | 5/2020 | | |
| DE | 102019122895 A1 | 3/2021 | | |
| EP | 3916626 A1 * | 12/2021 | ......... | G06K 9/00805 |
| WO | WO-2016109829 A1 * | 7/2016 | ......... | B60W 10/04 |
| WO | WO-2018172886 A1 * | 9/2018 | ......... | B60K 35/00 |
| WO | 2020130757 A1 | 6/2020 | | |

\* cited by examiner

(12) United States Patent

SYSTEMS AND METHODS FOR PREDICTION-BASED DRIVER ASSISTANCE

FIELD

The present disclosure is related to systems and methods for providing driver assistance via a display device in a vehicle. In particular, the present disclosure is related to providing driver assistance based on predicted risky scenarios, where the driver assistance includes an augmented reality visualization of a virtual vehicle.

BACKGROUND

Many state-of-the art cars are equipped with intelligent sensor systems designed to provide driving assistance, particularly in risky or challenging scenarios. An in-car system that provides assistance for performing various driving functions (e.g., navigation, cruise control, parking, lane detection, etc.) is typically referred to as advanced driver assistance system (ADAS). The ADAS typically uses data collected from vehicle sensors to generate visual, haptic and/or audio feedback to the driver. For example, lane departure feedback may be provided by generating audio feedback and/or vibrational (i.e., haptic) feedback on the steering wheel when the car is too close to lane markings. Depending on the level of the ADAS, the ADAS may also provide semi-autonomous or fully-autonomous driving assistance.

There has been increasing interest in providing driver assistance via a display device, for example a head-up display (HUD). A HUD is a transparent or semi-transparent display that enables data to be displayed on the front windshield of the car. This enables the driver to view the data without having to look away from the road. It would be useful for the ADAS to provide useful feedback to the driver via the display device, particularly to assist the driver in risky or challenging driving scenarios.

SUMMARY

A drawback of existing ADAS is that the ADAS feedback may not be intuitive to the driver. Many ADAS feedback are presented in the form of arrows, icons or numbers, which may not be intuitive. For example, if the vehicle is approaching an overpass, existing ADAS may provide feedback that displays the clearance height in numbers, and it is up to the driver to notice the displayed height, mentally compare the height to the vehicle dimensions, and decide whether the clearance height is sufficient for the vehicle to safely pass underneath. It may be cognitively onerous for a driver to notice such non-intuitive feedback, comprehend the meaning of the feedback and take risk-averting maneuvers in time, such as counter-steering or braking.

Another drawback of existing ADAS is that the driving assistance and feedback provided are only provided at the moment when the risky or challenging driving event is detected. This may again result in the driver failing to react in time to avert the risk.

Further, existing ADAS feedback is typically designed to highlight environmental elements to the driver, without necessarily showing the consequence of the driver's current actions. For example, existing ADAS feedback may highlight an oncoming car to the driver, without necessarily showing the collision that would result if evasive action is not taken. Typically, existing ADAS does not generate detailed predictions of how a vehicle is expected to behave or how the environment is expected to change in future timesteps. Accordingly, existing ADAS feedback cannot provide the driver with detailed information about how a possible future risk might occur unless evasive action is taken. The result is that a driver may not be able to fully appreciate the possible future risk.

In various examples, the present disclosure describes systems and methods for providing driver assistance via a display device, for example a HUD, and in particular where the driver assistance is provided in response to a predicted risk. The driver assistance that is provided includes augmented reality (AR) visual feedback, where a virtual vehicle, representing a future state of the actual vehicle, is displayed as an overlay over a view of the actual environment. For example, in cases where the AR feedback is provided via a HUD, a 2D displayable view of the virtual vehicle may be projected onto the windshield so that the virtual vehicle is viewed together with the real-world environment through the windshield. In another example, in cases where the AR feedback is provided via a dashboard display of the vehicle, the virtual vehicle may be displayed as a virtual overlay over a live front-camera view of the real-world environment.

Examples of the present disclosure provide the technical advantage that the AR feedback includes a virtual vehicle that responds in real-time (or near real-time) to how the actual vehicle is controlled, reflecting how a future state of the vehicle would be affected by the current vehicle control. This provides feedback to the driver that explicitly shows the consequence of the driver's current actions, which is not possible with existing ADAS feedback.

Examples of the present disclosure also provides the technical advantage of a risk prediction system, which integrates information from a 3D map of the environment, vehicle motion dynamics and vehicle predicted trajectory into a prediction of risk for a future timestep. In some examples, a virtual environment reconstruction system may use the integrated information to generate a virtual reconstruction of the environment, which may be used as a 3D environment map corresponding to one or more defined future timesteps (as well as the current timestep). Then, a detailed physics simulation of both the environment and the vehicle over a defined number of future timesteps may be used by the risk prediction system to generate a prediction of risk. The prediction of risk is then used to generate AR feedback that is better tailored to the particular risky scenario.

In some example aspects, the present disclosure describes a method including: obtaining a current vehicle state of a vehicle at a current timestep and an environment map representing an environment of the vehicle at least at the current timestep; generating augmented reality feedback including a virtual vehicle representing a predicted future vehicle state, wherein the predicted future vehicle state is predicted for a given future timestep based on at least one of the current vehicle state or the environment map; and outputting the generated augmented reality feedback including the virtual vehicle to be displayed by a display device.

In an example of the preceding example aspect of the method, generating the augmented reality feedback may include: generating, for each one or more future timesteps, a respective predicted future vehicle state based on the current vehicle state; determining a predicted risk at the given future timestep by applying a defined risk check to the predicted future vehicle state corresponding to the given future timestep, the defined risk check including a risk check of the predicted future vehicle state corresponding to the given future timestep with respect to the environment map; where the augmented reality feedback may be generated responsive to determining the predicted risk.

In an example of the preceding example aspect of the method, determining the predicted risk at the given future timestep by applying the defined risk check may include: determining that the predicted future vehicle state corresponding to the given future timestep indicates a predicted vehicle location is within a defined distance threshold from a detected object in the environment.

In an example of the preceding example aspect of the method, the detected object may be a dynamic object in the environment, and where the predicted vehicle location may be determined to be within a defined distance threshold from the dynamic object based on a predicted trajectory of the dynamic object.

In an example of the preceding example aspect of the method, determining the predicted risk at the given future timestep by applying the defined risk check may include: computing a future trajectory of the vehicle from the given future timestep to a next future timestep; and determining that the vehicle traveling over the future trajectory intersects or abuts a detected object in the environment.

In an example of the preceding example aspect of the method, the detected object may be a dynamic object in the environment, and where the vehicle traveling over the future trajectory may be determined to intersect or abut the dynamic object based on a predicted trajectory of the dynamic object.

In an example of the preceding example aspect of the method, determining the predicted risk at the given future timestep by applying the defined risk check may include one of: determining that a yaw rate of the predicted future vehicle state corresponding to the given future timestep is different from a predicted trajectory heading rate, and a gradient of a yaw angle of the predicted future vehicle state corresponding to the given future timestep is different from a gradient of a steering angle of the predicted future vehicle state corresponding to the given future timestep; or determining that a linear speed of the predicted future vehicle state corresponding to the given future timestep is greater than a defined speed threshold.

In an example of the preceding example aspect of the method, generating the augmented reality feedback may include: generating a virtual object indicating the predicted risk, the virtual object being generated to be displayed relative to the virtual vehicle.

In an example of the preceding example aspect of the method, generating the augmented reality feedback may include: determining a predicted risk based on detecting activation of a safety system of the vehicle, where the augmented reality feedback may be generated responsive to determining the predicted risk.

In an example of any of the preceding example aspects of the method, the method may include: obtaining an updated vehicle state at a next current timestep or an updated vehicle control signal at a next current timestep; updating the virtual vehicle representing an updated predicted future vehicle state, based on the updated vehicle state or the updated vehicle control signal; and outputting the generated augmented reality feedback including the updated virtual vehicle to be displayed by the display device.

In an example of any of the preceding example aspects of the method, the given future timestep may be selected based on a current speed of the vehicle included in the current vehicle state.

In some example aspects, the present disclosure describes a vehicle control system of a vehicle. The vehicle control system includes: a processing system; and a memory storing instructions executable by the processing system to cause the vehicle control system to: obtain a current vehicle state of the vehicle at a current timestep and an environment map representing an environment of the vehicle at least at the current timestep; generate augmented reality feedback including a virtual vehicle representing a predicted future vehicle state, wherein the predicted future vehicle state is predicted for a given future timestep based on at least one of the current vehicle state or the environment map; and output the generated augmented reality feedback including the virtual vehicle to be displayed by a head-up display of the vehicle.

In an example of the preceding example aspect of the vehicle control system, the instructions may further cause the vehicle control system to generate the augmented reality feedback by: generating, for each one or more future timesteps, a respective predicted future vehicle state based on the current vehicle state; determining a predicted risk at the given future timestep by applying a defined risk check to the predicted future vehicle state corresponding to the given future timestep, the defined risk check including a risk check of the predicted future vehicle state corresponding to the given future timestep with respect to the environment map; where the augmented reality feedback may be generated responsive to determining the predicted risk.

In an example of the preceding example aspect of the vehicle control system, the instructions may further cause the vehicle control system to determine the predicted risk at the given future timestep by applying the defined risk check by: determining that the predicted future vehicle state corresponding to the given future timestep indicates a predicted vehicle location is within a defined distance threshold from a detected object in the environment In an example of the preceding example aspect of the vehicle control system, the detected object may be a dynamic object in the environment, and where the predicted vehicle location may be determined to be within a defined distance threshold from the dynamic object based on a predicted trajectory of the dynamic object.

In an example of the preceding example aspect of the vehicle control system, the instructions may further cause the vehicle control system to determine the predicted risk at the given future timestep by applying the defined risk check by: computing a future trajectory of the vehicle from the given future timestep to a next future timestep; and determining that the vehicle traveling over the future trajectory intersects or abuts a detected object in the environment.

In an example of the preceding example aspect of the vehicle control system, the detected object may be a dynamic object in the environment, and where the vehicle traveling over the future trajectory may be determined to intersect or abut the dynamic object based on a predicted trajectory of the dynamic object.

In an example of the preceding example aspect of the vehicle control system, the instructions may further cause the vehicle control system to determine the predicted risk at the given future timestep by applying the defined risk check by: determining that a yaw rate of the predicted future vehicle state corresponding to the given future timestep is different from a predicted trajectory heading rate, and a gradient of a yaw angle of the predicted future vehicle state corresponding to the given future timestep is different from a gradient of a steering angle of the predicted future vehicle state corresponding to the given future timestep; or determining that a linear speed of the predicted future vehicle state corresponding to the given future timestep is greater than a defined speed threshold, wherein the defined speed threshold is defined based on the environment map.

In an example of the preceding example aspect of the vehicle control system, the instructions may further cause the vehicle control system to generate the augmented reality feedback by: generating a virtual object indicating the predicted risk, the virtual object being generated to be displayed relative to the virtual vehicle.

In an example of any of the preceding example aspects of the vehicle control system, the instructions may further cause the vehicle control system to generate the augmented reality feedback by: determining a predicted risk based on detecting activation of a safety system of the vehicle; where the augmented reality feedback may be generated responsive to determining the predicted risk.

In an example of any of the preceding example aspects of the vehicle control system, the instructions may further cause the vehicle control system to: obtain an updated vehicle state at a next current timestep or an updated vehicle control signal at a next current timestep; update the virtual vehicle representing an updated predicted future vehicle state, based on the updated vehicle state or the updated vehicle control signal; and output the generated augmented reality feedback including the updated virtual vehicle to be displayed by the head-up display of the vehicle.

In an example of any of the preceding example aspects of the vehicle control system, the given future timestep may be selected based on a current speed of the vehicle included in the current vehicle state.

In an example of any of the preceding example aspects of the vehicle control system, the vehicle control system may further include: an advanced driver assistance system for generating the current vehicle state and the environment map.

In some example aspects, the present disclosure describes a computer readable medium having instructions encoded thereon, wherein the instructions, when executed by a processing unit of a system, cause the system to perform any of the preceding example aspects of the method.

In some example aspects, the present disclosure describes a computer program including instructions which, when the program is executed by a computer, cause the computer to carry out any of the preceding example aspects of the method.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

Some examples of the present disclosure are described in the context of vehicles having an advanced driver assistance system (ADAS). The ADAS may provide assistance at any level, including providing full autonomous control of the vehicle (i.e., level 5 ADAS), semi-autonomous control or requiring full user control (i.e., level 0 ADAS). Although examples described herein may refer to a car as the vehicle, the teachings of the present disclosure may be implemented in other forms of vehicles that may be equipped with ADAS including, for example, trams, subways, trucks, buses, surface and submersible watercraft and ships, aircraft, warehouse equipment, construction equipment, farm equipment, and other such vehicles.

Figure 1A:
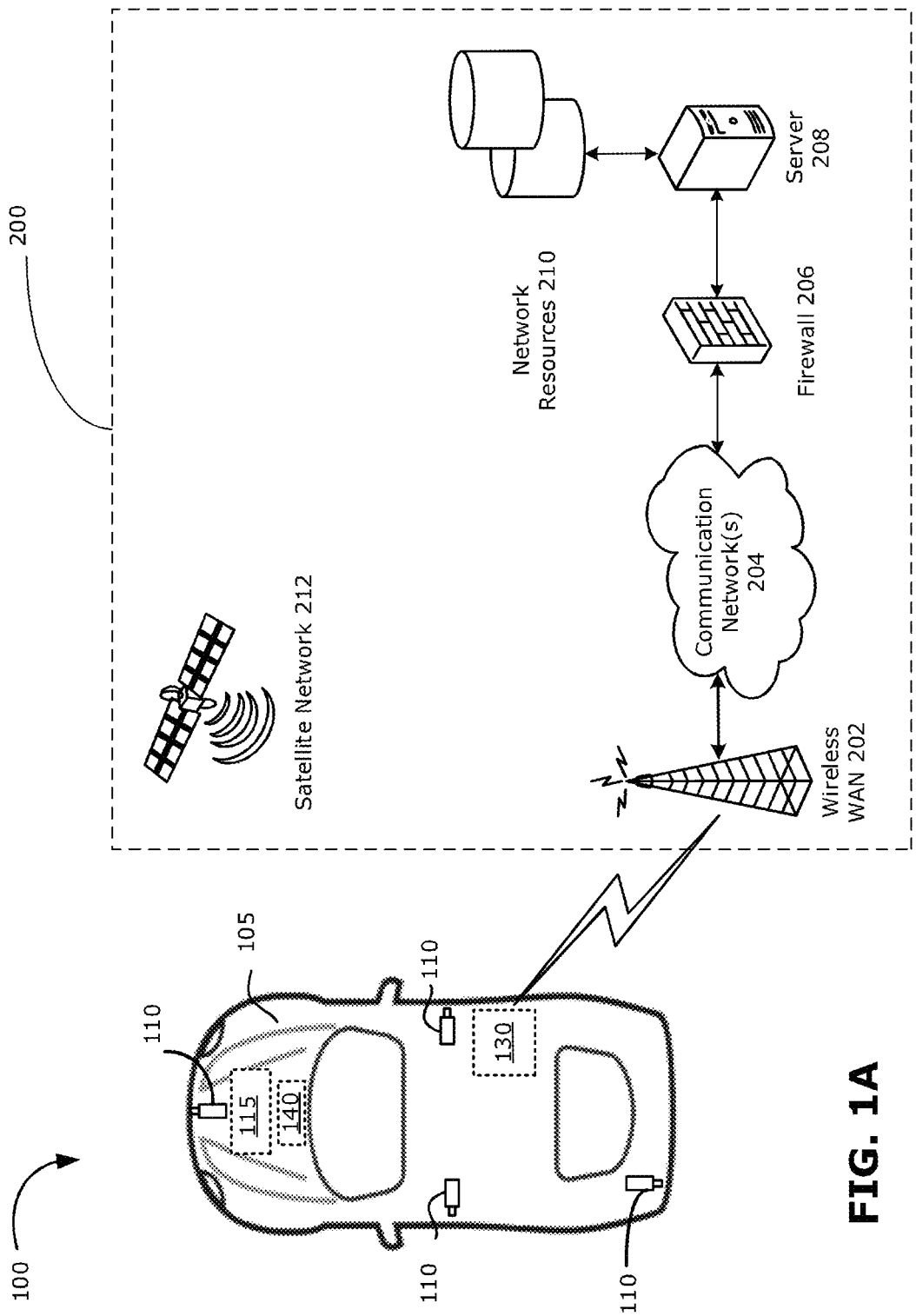
FIG. 1A is a schematic diagram showing an example environment and vehicle, in which examples of the present disclosure may be implemented.

FIG. 1A is a schematic diagram showing an example environment 100 in which a vehicle 105 operates. Examples of the present disclosure may be implemented in the vehicle 105, for example to provide driver assistance via a visual display. The environment 100 includes a communication system 200 that communicates with the vehicle 105. The vehicle 105 includes a vehicle control system 115. The vehicle control system 115 may include an ADAS, as described further below with reference to FIG. 1B. In some examples, the vehicle control system 115 may be coupled to a drive control system and/or electromechanical system of the vehicle 105, to enable the vehicle 105 to be operable in a fully-autonomous mode (in addition to a semi-autonomous or fully user-controlled mode).

The vehicle 105 may include sensors, shown here as a plurality of environment sensors 110 that collect information about the external environment 100 surrounding the vehicle 105 and generate sensor data indicative of such information, and a plurality of vehicle sensors 140 that collect information about the operating conditions of the vehicle 105 and generate sensor data indicative of such information. There may be different types of environment sensors 110 to collect different types of information about the environment 100, as discussed further below. In an example embodiment, the environment sensors 110 are mounted to and located at the front, rear, left side and right side of the vehicle 105 to collect information about the external environment 100 located in front, rear, left side and right side of the vehicle 105. Individual units of the environment sensors 110 may be mounted or otherwise located on the vehicle 105 to have different overlapping or non-overlapping fields of view (FOVs) or coverage areas to capture data about the environment 100 surrounding the vehicle 105. The vehicle control system 115 receives sensor data indicative of collected information about the external environment 100 of the vehicle 105 as collected by the environment sensors 110.

The vehicle sensors 140 provide sensor data indicative of collected information about the operating conditions of the vehicle 105 to the vehicle control system 115 in real-time or near real-time. For example, the vehicle control system 115 may determine a linear speed of the vehicle 105, angular speed of the vehicle 105, acceleration of the vehicle 105, engine RPMs of the vehicle 105, transmission gear and tire grip of the vehicle 105, among other factors, using sensor data indicative of information about the operating conditions of the vehicle 105 provided by one or more of the vehicle sensors 140.

The vehicle control system 115 may include or be coupled to one or more wireless transceivers 130 that enable the vehicle control system 115 to communicate with a communication system 200. For example, the wireless transceiver(s) 130 may include one or more cellular (RF) transceivers for communicating with a plurality of different radio access networks (e.g., cellular networks) using different wireless data communication protocols and standards. The wireless transceiver(s) 130 may communicate with any one of a plurality of fixed transceiver base stations of a wireless wide area network (WAN) 202 (e.g., cellular network) within its geographic coverage area. The one or more wireless transceiver(s) 130 may send and receive signals over the wireless WAN 202. The one or more wireless transceivers 130 may comprise a multi-band cellular transceiver that supports multiple radio frequency bands. The vehicle control system 115 may use the wireless WAN 202 to access a server 208, such as a driving assist server, via one or more communications networks 204, such as the Internet. The server 208 may be implemented as one or more server modules in a data center and is typically located behind a firewall 206. The server 208 may be connected to network resources 210, such as supplemental data sources that may provide information to be used by the vehicle control system 115.

The wireless transceiver(s) 130 may also comprise a wireless local area network (WLAN) transceiver for communicating with a WLAN (not shown) via a WLAN access point (AP). The WLAN may comprise a Wi-Fi wireless network which conforms to IEEE 802.11x standards (sometimes referred to as Wi-Fi®) or other communication protocol. The wireless transceiver(s) 130 may also comprise a short-range wireless transceiver, such as a Bluetooth® transceiver, for communicating with a mobile computing device, such as a smartphone or tablet. The wireless transceiver(s) 130 may also comprise other short-range wireless transceivers including but not limited to Near field communication (NFC), IEEE 802.15.3a (also referred to as UltraWideband (UWB)), Z-Wave, ZigBee, ANT/ANT+ or infrared (e.g., Infrared Data Association (IrDA) communication).

The communication system 200 also includes a satellite network 212 comprising a plurality of satellites. The vehicle control system 115 may use signals from the plurality of satellites in the satellite network 212 to determine its position. The satellite network 212 typically comprises a plurality of satellites which are part of at least one Global Navigation Satellite System (GNSS) that provides autonomous geo-spatial positioning with global coverage. For example, the satellite network 212 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

Figure 1B:
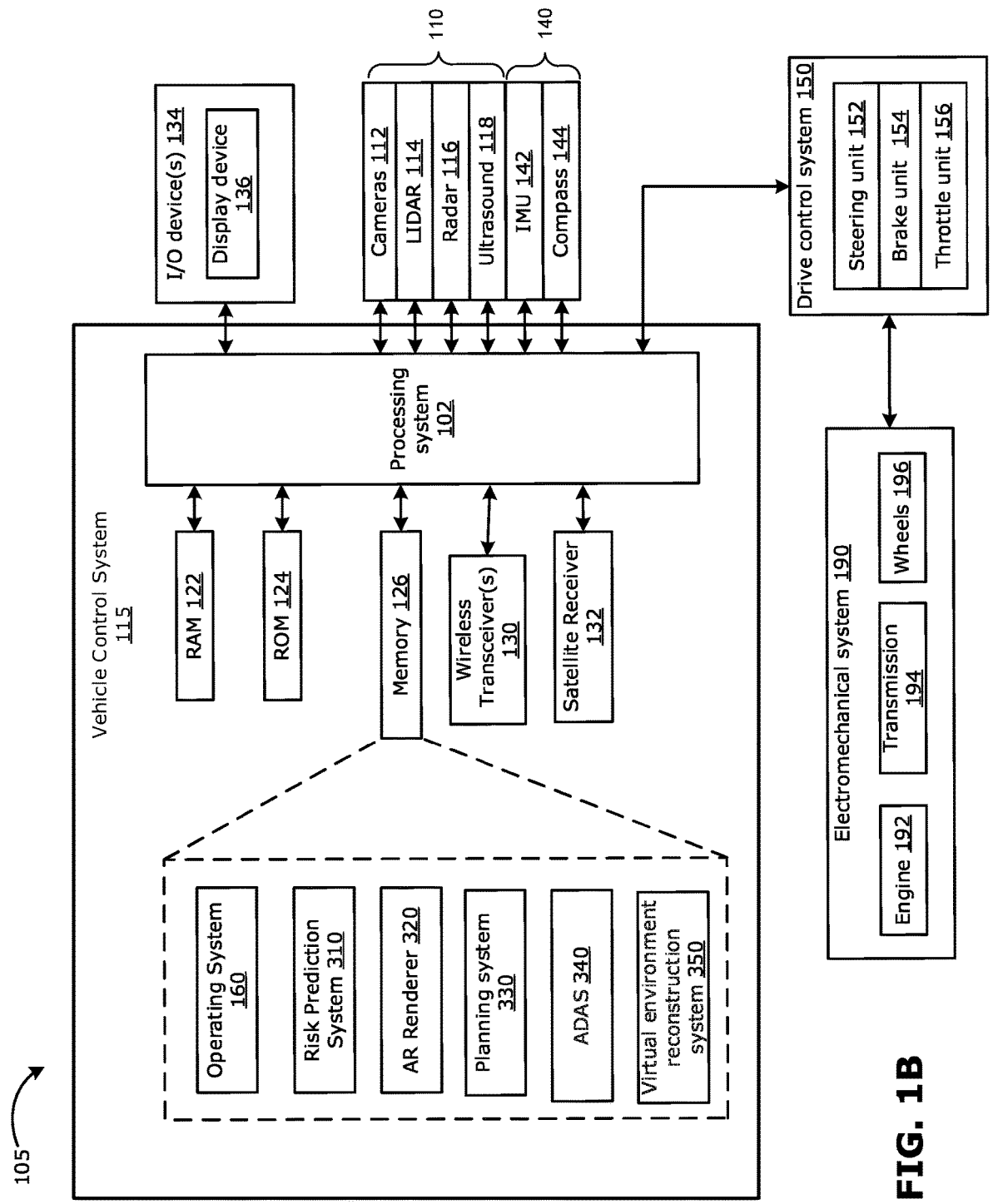
FIG. 1B is a block diagram illustrating some example components of a vehicle in which examples of the present disclosure maybe implemented.

FIG. 1B illustrates selected components of the vehicle 105 in accordance with some examples described herein. The vehicle 105 includes a vehicle control system 115 that may be coupled to a drive control system 150 and/or an electromechanical system 190, to enable the vehicle 105 to operate in a fully-autonomous or semi-autonomous mode. In some examples, the vehicle control system 115 may only provide driver assistance, without controlling physical functions of the vehicle 105. The vehicle control system 115 is also coupled to receive data from the environment sensors 110 and the vehicle sensors 140.

The environment sensors 110 may, for example, include one or more camera units 112, one or more light detection and ranging (LIDAR) units 114, one or more radar units 116, and one or more ultrasound units 118, among other possibilities. Each type of sensor unit 112, 114, 116, 118 may collect respective different information about the environment 100 external to the vehicle 105, and may provide sensor data to the vehicle control system 115 in respective formats. For example, a camera unit 112 may provide camera data representative of a digital image, a LIDAR unit 114 may provide a two or three-dimensional point cloud, the radar unit 116 may provide radar data representative of a radar image, and the ultrasound unit 118 may provide ultrasonic data.

The vehicle sensors 140 may include, for example, an inertial measurement unit (IMU) 142 that senses the vehicle's 105 specific force and angular rate and that provides data about an orientation of the vehicle based on the sensed specific force and angular rate. The vehicle sensors 140 may also include an electronic compass 144, and other vehicle sensors (not shown) such as a speedometer, a tachometer, wheel traction sensor, transmission gear sensor, throttle and brake position sensors, and steering angle sensor, among other possibilities.

The vehicle control system 115 may also collect information about a position of the vehicle 105 using signals received from the satellite network 212, via a satellite receiver 132 (also referred to as a GPS receiver) and generate positioning data representative of the position of the vehicle 105. In some examples, in addition to or instead of using information from the satellite receiver 132 to determine the position of the vehicle 105, the vehicle control system 115 may store a previously-generated high-definition (HD) map and may determine the position of the vehicle 105 by referencing information in the HD map with information from the environment sensors 110 (e.g., using TomTom HD maps to support navigation in autonomous vehicles).

The vehicle 105 also comprises various structural elements such as a frame, doors, panels, seats, windows, mirrors and the like that are known in the art but that have been omitted from the present disclosure to avoid obscuring the teachings of the present disclosure. The vehicle control system 115 includes a processing system 102 that is coupled to a plurality of components via a communication bus (not shown) which provides a communication path between the components and the processing system 102. The processing system 102 may include one or more processing units, including for example one or more central processing units (CPUs), one or more graphical processing units (GPUs), one or more tensor processing units (TPUs), and other processing units. The processing system 102 is coupled to the drive control system 150, a Random Access Memory (RAM) 122, a Read Only Memory (ROM) 124, a persistent (non-volatile) memory 126 such as flash erasable programmable read only memory (EPROM) (flash memory), the wireless transceiver(s) 130, the satellite receiver 132, and one or more input/output (I/O) devices 134 (e.g., touchscreen, speaker, microphone, display screen, mechanical buttons, etc.). In some examples, the I/O devices 134 may include a display device 136, such as a head-up display (HUD) unit, capable of providing an augmented reality (AR) display (i.e., a display of one or more virtual objects together with a live view of a real-world environment). For example, a HUD unit may enable virtual object(s) to be displayed in a front windshield (or other front-facing display/window/viewport) of the vehicle 105, such that the virtual object(s) is(are) overlaid on a real-world view of the environment 100. The HUD unit may provide a display over only a portion of the windshield or may provide a display that spans all or most of the windshield. The HUD unit may use any suitable hardware to generate the display. In another example, the display device 136 may be integrated with the vehicle 105, such as a dashboard-mounted display that enables virtual object(s) to be displayed overlaid on a live camera view of the environment 100. In another example, the display device 136 may not be integrated with the vehicle 105, such as a wearable device (e.g., a head mounted display (HMD), or smartglasses) that enables virtual object(s) to be displayed overlaid on a live camera view or real-world view of the environment 100, and that updates the AR display to track the movement of the wearer's head. Other embodiments of the display device 136 may be possible within the scope of the present disclosure.

The drive control system 150 provides control signals to the electromechanical system 190 to effect physical control of the vehicle 105. When in fully-autonomous or semi-autonomous driving mode, for example, the drive control system 150 receives a planned action (e.g., generated using a planning system 330) from the vehicle control system 115 and translates the planned action into control signals using a steering unit 152, a brake unit 154 and a throttle (or acceleration) unit 156. If the vehicle 105 is operating in semi-autonomous or fully user-controlled mode, inputs to the drive control system 150 may be manual inputs (e.g., provided by the driver operating a steering wheel, accelerator pedal, brake pedal, etc.). Each unit 152, 154, 156 may be implemented as software module(s) or control block(s) within the drive control system 150. The drive control system 150 may include additional components to control other aspects of the vehicle 105 including, for example, control of turn signals and brake lights.

The electromechanical system 190 receives control signals from the drive control system 150 to operate the electromechanical components of the vehicle 105. The electromechanical system 190 effects physical operation of the vehicle 105. The electromechanical system 190 comprises an engine 192, a transmission 194 and wheels 196. The engine 192 may be a gasoline-powered engine, a battery-powered engine, or a hybrid engine, for example. Other components may be included in the mechanical system 190, including, for example, turn signals, brake lights, fans and windows.

The memory 126 of the vehicle control system 115 has stored thereon software instructions that are executable by one or more processing units of the processing system 102. The software instructions may be executed by the processing system 102 to implement one or more software systems, software subsystems, and software modules. Generally, it should be understood that software systems, software subsystems, and software modules disclosed herein may be implemented as a set of computer-readable instructions stored in the memory 126. For example, the memory 126 may include executable instructions for implementing an operating system 160, a risk prediction system 310, an AR renderer 320, the planning system 330, an ADAS 340 and a virtual environment reconstruction system 350. The memory 126 may also have stored thereon instructions for implementing other software systems, subsystems, and modules, for example a navigation module, a climate control module, a media player module, a telephone module and/or a messaging module.

In some examples, the planning system 330 provides path planning (e.g., including mission planning, behavior planning and motion planning) for the vehicle 105. For example, the planning system 330 may generate planned actions to be performed by the vehicle 105 (e.g., by communicating the planned actions to the drive control system 150), to enable the vehicle 105 to operate in fully-autonomous or semi-autonomous mode. In examples where the vehicle 105 does not have fully-autonomous or semi-autonomous capabilities, the planning system 330 may be omitted. In examples where the planning system 330 is present in the vehicle control system 115, the risk prediction system 310, ADAS 340 and/or virtual environment reconstruction system 350 may be provided as part of the planning system 330 (or vice versa).

For clarity, the vehicle 105 in which the risk prediction system 310, the AR renderer 320, the planning system 330, the ADAS 340 and the virtual environment reconstruction system 350 are implemented may be referred to as the ego vehicle, to distinguish from other vehicles in the environment 100 (although it should be noted that other vehicles in the environment 100 may also be equipped with their own ADAS, etc.). In general, references to the vehicle 105 should be understood to refer to the ego vehicle 105; other vehicles in the environment 100 may be referred to as other vehicles or non-ego vehicles.

Sensor data received from the environment sensors 110 and vehicle control sensors 140 (and optionally also positioning data received via the satellite receiver 132) may be used by the ADAS 340 to perform perception functions, including interpreting sensor data to reconstruct certain features of interest about the environment 100 and to determine a state of the vehicle 105. Output from the ADAS 340 is used by the risk prediction system 310 and the AR renderer 320, as discussed further below.

It should be understood that the ADAS 340 may be any ADAS that is typically found in state-of-the-art cars. An example ADAS 340 is now described. The ADAS 340 may perform sensor fusion, which combines information extracted from different sensor data. Sensor data that is inputted to the ADAS 340 may include data from the camera unit 112, the LIDAR unit 114, the radar unit 116 and the ultrasound unit 118. The camera unit 112 generates color image data that may be used for road detection and on-road object detection. The radar unit 116 generates radar data that may be used for short and long range distance estimation to objects in the environment 100. The LIDAR unit 116 generates point cloud data containing sparse 3D points representing reflected light from objects in the environment 100. The ultrasound unit 118 generates ultrasound data that may be used for close range distance measurement, such as in parking scenarios. Sensor fusion enables data from these different sensors 112, 114, 116, 118 to be combined in an intelligent way, to provide a richer and more complete understanding of the environment 100. Various techniques may be used by the ADAS 340 to perform sensor fusion, such as feature-level fusion (e.g., associating features extracted from color image data with a 3D point in a point cloud) and/or decision-level fusion (e.g., using two separate classifiers trained on camera data and LIDAR data respectively).

The ADAS 340 may also use data from the satellite receiver 132 (e.g., GPS data) and sensor data from the vehicle control sensors 140 (e.g., the IMU 142) to estimate the location and pose (also referred to as the orientation) of the vehicle 105 within the environment 100.

The ADAS 340 may also perform behavior planning and trajectory prediction. In some examples, the ADAS 340 may cooperate with the planning system 330 (or may be part of the planning system 330) to perform such functions. Behavior planning involves generating behavior decisions to ensure the vehicle 105 follows defined driving rules (e.g., following safe driving rules, obeying traffic signs, etc.). Trajectory prediction involves generating a predicted trajectory of the vehicle 105 over a defined prediction horizon in time. As in some examples, the ADAS 340 may use model predictive control (MPC) for trajectory and vehicle motion prediction.

The ADAS 340 may output a current state of the vehicle 105, which includes data representing the current operation of the vehicle 105. The current state of the vehicle 105 may also include estimated or predicted data, such as the predicted trajectory of the vehicle 105. For example, the current state of the vehicle 105 may include linear speed, angular speed, linear acceleration, angular acceleration, location (e.g., relative to a GPS frame of reference), pose (e.g., pitch, yaw and roll), and predicted trajectory, among others.

Generally, the ADAS 340 may output a 3D map (or other data structure) representing the environment 100 and the state of the vehicle 105 within the environment 100. The output from the ADAS 340 is provided to the risk prediction system 310. The risk prediction system 310 may receive other inputs, such as a 3D model of the vehicle 105 (e.g., defined or pre-programmed by the manufacturer of the vehicle 105), and vehicle control signals (e.g., from the drive control system 150).

The virtual environment reconstruction system 350 is illustrated in FIG. 1B as being separate from the risk prediction system 310, planning system 330 and ADAS 340. In other examples, the virtual environment reconstruction system 350 may be a subsystem of one or more of the risk prediction system 310, planning system 330 and/or ADAS 340. The virtual environment reconstruction system 350 performs operations to generate a virtual reconstruction (i.e., a reconstructed 3D map) of the environment 100.

For example, the virtual environment reconstruction system 350 may receive real-time sensor data from the environment sensors 110 (e.g., camera unit 112, LIDAR unit 114, radar unit 116, ultrasound unit 118, etc.), may receive other environmental data from the satellite receiver 132 (e.g., GPS data, weather data such as wind speed, precipitation, etc.), as well as information from a pre-stored HD map (e.g., previously generated and stored by the vehicle control system 115). Using this data, the virtual environment reconstruction system 350 generates a detailed 3D reconstruction of the environment 100, also referred to as a 3D environment map. In particular, the 3D environment map (or simply environment map) may enable a detailed, physics level (i.e., accurately reproducing the real-world physics of the environment 100) simulation of the environment 100 over a defined number of future timesteps. The environment map may include the vehicle 105 (which may be suitably localized within the environment 100 by performing localization of the vehicle 105 using the sensor data), and both static and dynamic objects in the environment 100. In particular, the behavior and movement of dynamic objects in the environment 100 may be predicted (e.g., using suitable dynamic object prediction algorithms) in an environment map that includes a prediction of the reconstructed environment 100 for a future timestep. Thus, the environment map may provide a detailed and multi-faceted map of the environment both for the current timestep as well as one or more future timesteps. The environment map may thus encompass both a map of the current environment as well as a map of the future environment. The environment map may be used by the risk prediction system 310, to enable prediction of risks for one or more future timesteps.

As previously described, fusion of data from different sensors and satellite data together with information from a pre-stored HD map may be performed. This enables the virtual environment reconstruction system 350 to generate an environment map that is a relatively realistic and accurate reconstruction of the environment 100, where the environment map may be used as a virtual environment for performing simulations (also referred to as a virtual "sandbox"). This reconstruction may be performed using various existing techniques, some of which are described below. The virtual environment reconstruction system 350 may first reconstruct a relatively detailed and precise (e.g., capturing details down to the size of several centimeters, or 10 s of centimeters) geometry of the real-world environment 100. This may be performed by a fusion of the pre-stored HD map and real-time sensor data (e.g., data from the LIDAR unit 114) to produce a dense point cloud. The point cloud can then be further voxelized (e.g., as described by Hinks et al. "Point Cloud Data Conversion into Solid Models via Point-Based Voxelization"*Journal of Surveying Engineering,* 139(2):72-83, 2013), and the geometry of the environment 100 can be obtained. The virtual environment reconstruction system 350 may further obtain data about the physical properties of the environment 100 (such as the surface texture of the road) and other environmental variables that may affect a driving scenario (such as wind, precipitation, temperature, etc.). For example, surface textures of the environment 100 can be obtained via pre-stored HD maps (e.g., in cases where such information is already encoded in a HD map) fused with real-time texture mapping reconstruction using methods such as depth camera or optical tactile sensors (e.g., as described by Jiang et al. "A 3-D Surface Reconstruction with Shadow Processing for Optical Tactile Sensors" *Sensors* 18(9):2785, 2018; or Lee et al. "TextureFusion: High-Quality Texture Acquisition for Real-Time RBG-D Scanning" *CVPR,* 2020, pp. 1272-1280). Other physical properties of the environment 100 can also be obtained, for example via the environment sensors 110 and/or satellite receiver 132 of the vehicle 105. The virtual environment reconstruction system 350 thus performs physical mapping of the environment 100 features (e.g., surface textures, etc.) onto the reconstructed geometry. The virtual environment reconstruction system 350 also reconstructs dynamic properties of dynamic objects in the environment 100 (such as pedestrian and vehicle trajectory). For example, sensor data obtained via the environment sensors 110 of the vehicle 105 and/or via a vehicle network (in the case where the vehicle 105 is capable of communications with a vehicle network, such as a vehicle-to-vehicle network) may enable the vehicle 105 to determine (e.g., predict using appropriate classical or machine learning models) a trajectory for each dynamic object detected in the environment 100.

The risk prediction system 310 may cooperate with the virtual environment reconstruction system 350 to perform dynamic, physics level (i.e., based on real-world physics of the environment 100 and the vehicle 105) simulations of the vehicle 105 within the environment map for one or more defined future timesteps. For example, by simulating the vehicle 105 within the environment map, a prediction may be made whether a risky scenario occurs at a future timestep (e.g., whether the simulation predicts that the vehicle 105 would collide with another moving vehicle in the environment; whether the simulation predicts that the vehicle 105 would drift into another lane due to high wind speeds; etc.). It should be noted that the virtual environment reconstruction system 350 generates a 3D environment map that is an accurate representing of the real-world physics of the environment 100, thus enabling simulations to be conducted to precisely generate predictions of the vehicle 105 and the future environment 100 at a future timestep, based on the actual physics properties of the environment 100 (e.g., including effect of different surface textures of the road, effect of wind speed, effect of precipitation, etc.) and the vehicle 105 (e.g., based on a detailed, physics-level 3D model of the vehicle, which may be provided by the manufacturer of the vehicle 105). In other words, the environment map may be used to perform a detailed simulation of the vehicle 105 within the virtual reconstructed environment, for example using a physics engine, in a way that is not possible using conventional occupancy maps (which represent only the occupancy of objects in the environment, not their physics properties).

In some examples, in addition to or instead of the virtual reconstruction described above, the ADAS 340 may use information from a pre-stored HD map (e.g., previously generated and stored by the vehicle control system 115) together with sensor data from the environment sensors 110 to perform localization of the vehicle 105 within the environment 100 as represented by the HD map. For example, the ADAS 340 may perform fusion of sensor data, as discussed above, and then reference the fused data with the HD map to localize the vehicle 105 in the context of the HD map. The reconstruction of the environment 100 and localization of the vehicle 105 relative to the HD map may enable the ADAS 340 to provide a more accurate 3D map to the risk prediction system 310. The ADAS 340 may also be able to better perform behavior planning and trajectory prediction using a more accurate 3D map. For example, behavior planning may be able to better predict how the vehicle 105 (or other objects in the environment 100) would react to features of the environment 100, such as a pothole.

The risk prediction system 310, when executed, generates predications indicating whether or not the vehicle 105 will be in a risky scenario within a defined number of future timesteps (which may be referred to as the prediction horizon), based on the current state of the vehicle 105 (e.g., including current location, steering input, yaw, speed, acceleration, etc.). A risky scenario may refer to any scenario where the vehicle 105 is predicted to have an impact or a collision, given the current state of the vehicle 105 (including vehicle dynamics and trajectory) and the current and/or future environment 100 (where the environment 100 may be represented by a 3D environment map over the current timestep as well as one or more future timesteps (e.g., the environment map may include current locations of static and dynamic objects, as well as predicted future locations of dynamic objects). A risky scenario may also refer to any vehicle state that does not fall under normal vehicle operations, such as losing traction control. Some examples of risky scenarios include, without limitation, unexpected lane departure, driving at high speed while approaching an intersection or a turn, approaching an overhead obstacle lower than the vehicle clearance height, or following another vehicle too closely.

The risk prediction system 310 generates a predicted future state of the vehicle 105 for each timestep up to a defined number of future timesteps (which may vary depending on the vehicle speed, for example). The future state of the vehicle 105 may include data representing a predicted or estimated operation of the vehicle 105 at a future timestep. For example, the future state of the vehicle 105 may include predicted linear speed, predicted angular speed, predicted linear acceleration, predicted angular acceleration, predicted location, predicted pose (e.g., pitch, yaw and roll), etc. As will be discussed further below, the future state of the vehicle 105 may be predicted based on the current state of the vehicle 105, and may further be predicted based on how the vehicle 105 is predicted to be affected by properties of the environment 100 (e.g., road condition, environment conditions, etc.). For each predicted future state, the risk prediction system 310 performs a risk determination using one or more defined risk checks (which may be defined empirically). In some examples, the risk prediction system 310 may additionally or alternatively perform the risk determination based on a simulation of how the vehicle 105 interacts with the virtual reconstruction of the environment 100 (e.g., using a physics engine such as that used in computer simulation systems). The risk prediction system 310 outputs a risk prediction (which may be a binary prediction or may be a probabilistic prediction, for example). If a risk is predicted (e.g., a "yes" prediction or a higher than 0.5 probability of a risk), the risk prediction system 310 may additionally output information about the predicted risk, such as the type of risk predicted, the future timestep(s) when the risk is predicted and/or the predicted future state(s) of the vehicle 105 corresponding to the predicted risk.

The risk prediction system 310 communicates with the AR renderer 320, to control the display of an AR virtual vehicle via the display device 136. AR visualization refers to a virtual graphical object that is displayed through AR mediated display devices, such as the display device 136, in such a way that the virtual object appears to be located in the physical environment 100. The virtual object can be static or dynamic. In the case of an AR virtual vehicle rendered by the AR renderer 320, the AR virtual vehicle is rendered to be displayed by the display device 136 in such a way that the AR virtual vehicle appears to be operating (e.g., driving) in the environment 100 similar to a physical vehicle in the environment 100.

If the risk prediction system 310 generates a prediction that a risk scenario is within the prediction horizon, this prediction is outputted to the AR renderer 320. The AR renderer 320 performs operations to cause the display device 136 to display an AR virtual vehicle. The AR virtual vehicle (or simply virtual vehicle) provides real-time feedback of how the vehicle 105 is currently being handled by mimicking the maneuvers of the vehicle 105. The risk prediction system 310 continuously (e.g., at every timestep) generates predictions for whether one or more risky scenario is still present or whether the risk has been averted. If the risk has been averted (e.g., as a result of the driver taking risk-averting actions, or as a result of fully- or semi-autonomous control of the vehicle 105 by the vehicle control system 115), then the risk prediction system 310 communicates with the AR renderer 320 to stop the display of the virtual vehicle via the display device 136.

The AR renderer 320 takes as input information about the 3D environment 100 (e.g., generated by the ADAS 340), a 3D model of the vehicle 105 (e.g., defined or pre-programmed by the manufacturer of the vehicle 105), and control input from the drive control system 150 (e.g., including the steering input, which may be manual input or autonomous input), and generates a virtual vehicle that is displayed by the display device 136. The virtual vehicle is generated to reflect a predicted future state of the vehicle 105 at a future timestep. The relationship between the vehicle 105 and the virtual vehicle is one-to-one, meaning that the virtual vehicle behaves the same way as the vehicle 105 would behave, given the current control input, with the only difference being that the virtual vehicle reflects the predicted future state of the vehicle 105 (given the current control input). The projection distance of the virtual vehicle reflects the predicted location of the vehicle 105 at the future timestep, and may depend on the current speed of the vehicle 105. At a lower current speed, the virtual vehicle is projected at a distance which is smaller than the projection distance when the vehicle 105 is at a higher current speed.

Figure 2:
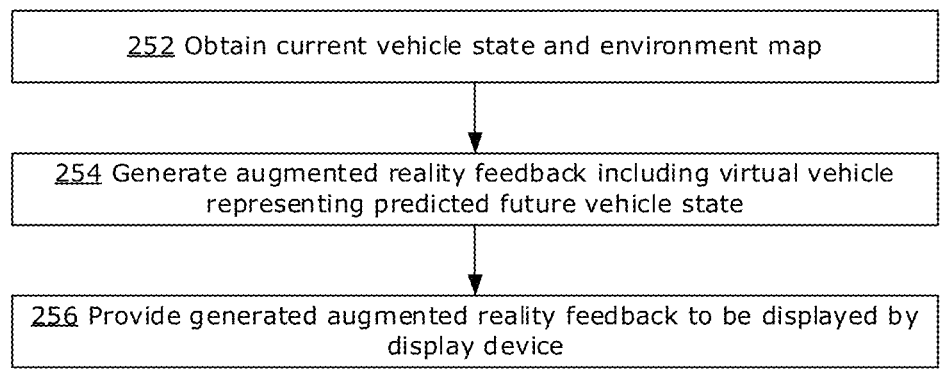
FIG. 2 is a flowchart illustrating an example method for providing driver assistance using AR feedback, in accordance with examples of the present disclosure.

FIG. 2 is a flowchart illustrating an example method 250 that may be performed by the vehicle control system 115 (e.g., using the risk prediction system 310 and the AR renderer 320) to provide driver assistance using AR feedback outputted by the display device 136.

At 252, the current state of the vehicle 105 (simply referred to as current vehicle state) and a 3D map of the environment 100 (simply referred to as environment map) are obtained. As described above, the current vehicle state and the environment map may be generated by the ADAS 340 and/or the virtual environment reconstruction system 350 using sensor data (and optionally other environmental data). It should be noted that the environment map may represent the environment 100 at the current timestep as well as at one or more defined future timesteps. The current vehicle state and the environment map may thus be obtained from the ADAS 340 and/or the virtual environment reconstruction system 350, by the risk prediction system 310. In some examples, the risk prediction system 310 may additionally obtain a set of current vehicle control signals (e.g., steering control, acceleration control, braking control, indicator or signal control) from the drive control system 150. In other examples, the current vehicle control signals may be explicitly or implicitly included in the current vehicle state (e.g., the current steering control may be implicitly included as the angular acceleration in the current vehicle state) from the ADAS 340. In some examples, the risk prediction system 310 may obtain a virtual reconstruction of the environment 100 from the virtual environment reconstruction system 350. The virtual reconstruction may represent the environment 100 at the current timestep as well as at one or more defined future timesteps (including predicted trajectories for any dynamic objects in the environment 100).

At 254, AR feedback is generated (e.g., using the AR renderer 320), including a virtual vehicle representing a predicted future vehicle state. In particular, the predicted future vehicle state may be predicted based on at least the current vehicle state, as discussed further below with reference to FIG. 3.

A predicted future vehicle state may be generated for one or more future timesteps, and the virtual vehicle may correspond to one of the future timestep. For example, a number of future timesteps, denoted as Q, may be defined in the risk prediction system 310 depending on the current speed of the vehicle 105. For a slower current speed Q may be smaller and for a faster current speed Q may be larger. Then, the risk prediction system 310 generates a predicted future vehicle state for each timestep T+1, T+2, ..., T+Q (where T denotes the current timestep).

The predicted future vehicle state that is used to generate the virtual vehicle for the AR feedback may correspond to any of the one or more future timesteps. For example, the virtual vehicle may be generated based on the predicted future vehicle state that is the furthest in the future amongst the one or more future timesteps (i.e., timestep T+Q). In another example, the virtual vehicle may be generated based on the predicted future vehicle state that corresponds to a future timestep where a risk is predicted (as discussed further below with reference to FIG. 3).

At 256, the generated augmented reality feedback, including the virtual vehicle, is outputted to be displayed by the display device 136.

The method 250 may be performed continuously in real-time or near real-time, to provide driver assistance via the AR feedback.

Figure 3:
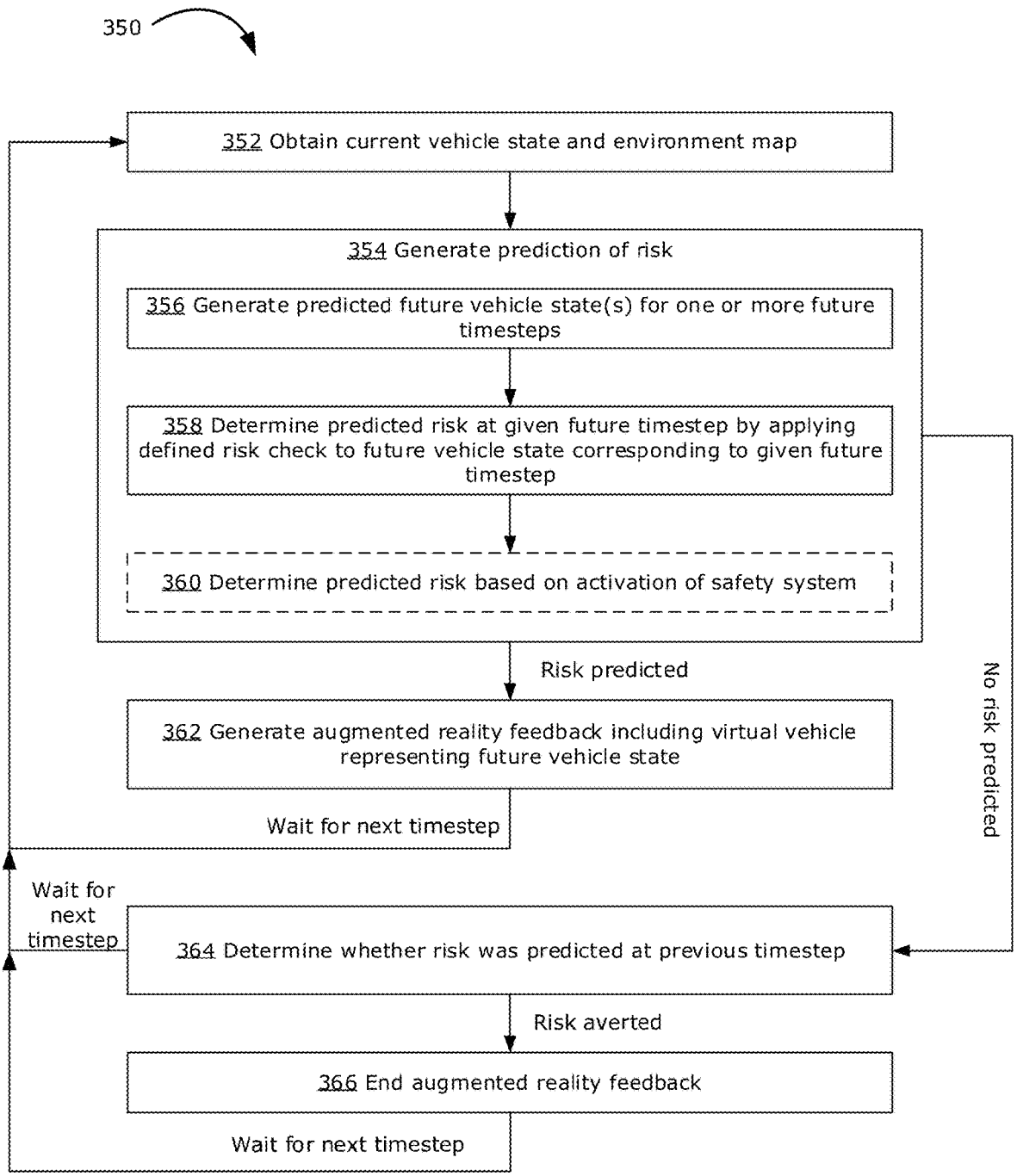
FIG. 3 is a flowchart illustrating an example method for providing prediction-based driver assistance using AR feedback, in accordance with examples of the present disclosure.

FIG. 3 is a flowchart illustrating an example method 350 that may be performed by the vehicle control system 115 (e.g., using the risk prediction system 310 and the AR renderer 320) to provide prediction-based driver assistance via the display device 136. The method 350 may be an example embodiment of the method 250, where the virtual vehicle is generated in response to a prediction of a risky scenario.

At 352, the current state of the vehicle 105 (simply referred to as current vehicle state) and a 3D map of the environment 100 (simply referred to as environment map) are obtained. As described above, the current vehicle state and the environment map may be generated by the ADAS 340 and/or the virtual environment reconstruction system 350 using sensor data (and optionally other environmental data). The current vehicle state and the environment map may thus be obtained from the ADAS 340 and/or the virtual environment reconstruction system 350, by the risk prediction system 310. In some examples, the risk prediction system 310 may additionally obtain a set of current vehicle control signals (e.g., steering control, acceleration control, braking control, indicator or signal control) from the drive control system 150. In other examples, the current vehicle control signals may be explicitly or implicitly included in the current vehicle state (e.g., the current steering control may be implicitly included as the angular acceleration in the current vehicle state) from the ADAS 340.

In some examples, the risk prediction system 310 may additionally obtain data representing operation (e.g., indicating activation or non-activation) of one or more safety systems of the vehicle 105. A safety system of the vehicle 105 may include, for example, an electronic traction control system or an electronic stability control system. Such a safety system may be considered to be part of the ADAS 340, and data about operation of the safety system may be included in the information obtained from the ADAS 340.

At 354, a prediction of risk is generated. The prediction of risk may be generated by determining any predicted risk at each of a defined number of future timesteps T+1 to T+Q (where T denotes the current timestep), using steps 356 and step 358 described below. Optionally, the prediction of risk may also be generated based on activation of a safety system at optional step 360 described below.

At 356, a predicted future vehicle state is generated for each one or more future timesteps. For example, a number of future timesteps, denoted as Q, may be defined in the risk prediction system 310 depending on the current speed of the vehicle 105. For a slower current speed Q may be smaller and for a faster current speed Q may be larger. Then, the risk prediction system 310 generates a predicted future vehicle state for each timestep T+1, T+2, ..., T+Q (where T denotes the current timestep).

Various techniques may be used by the risk prediction system 310 to generate the predicted future vehicle state(s). In an example, a high order polynomial extrapolation can be used by the risk prediction system 310 to generate the predicted future vehicle state(s). For example, the current vehicle state may be defined as $\delta_T=(s, \theta_{str}, \alpha)$, where ($\delta_T$ denotes the vehicle state at time T, s denotes the vehicle linear speed, $\theta_{str}$ denotes the steering angle and a denotes the predicted trajectory. The vehicle state may include other information, such as the vehicle location, vehicle acceleration, etc. As previously described, the predicted trajectory may be generated by the ADAS 340 and represents a prediction of the trajectory of the vehicle 105, assuming the current vehicle control signals are maintained, up to a prediction horizon. It should be noted that the prediction horizon of the predicted trajectory is not necessarily the same as the defined number of timesteps Q for generating the predicted future vehicle states at step 354. For example, the prediction horizon for the predicted trajectory may be a fixed number of timesteps regardless of the speed of the vehicle 105, whereas the defined number of future timesteps Q for generating the predicted future vehicle states may vary depending on the speed of the vehicle.

Using the current vehicle state ($\delta_T$, the risk prediction system 310 may perform extrapolation (e.g., using a high order polynomial extrapolation algorithm) to generate predicted future vehicle states $\delta_T+1, \ldots, \delta_{T+Q}$. This extrapolation may be performed by stepping forward one timestep at a time, as follows:

$$\delta_{T+Q}=f(\delta_{T+Q-1})$$

As represented in the above equation, the predicted future vehicle state at any timestep T+k is computed by performing extrapolation from the vehicle state in the immediately previous timestep T+k−1. Over the defined number of future timesteps T+1 to T+Q, a per second step function may help to suppress or minimize error propagation if a larger step function is used.

At 358, the predicted risk at each given future timestep (i.e., from T+1 to T+Q) is determined by applying one or more defined risk checks to the predicted future vehicle state corresponding to each given future timestep. The defined risk checks may be empirically defined rules, based on known and/or common risk scenarios experience by vehicles 105. The defined risk checks may be applied to each future timestep one at a time, such that if a risk is detected at a given future timestep, denoted as T', a risk is predicted and no risk check needs to be applied to any subsequent future time step T'+k.

For example, a defined risk check may be a check to determine whether the vehicle 105 at the given future timestep T' is at risk of being too close to an object in the environment 100. This risk check may be performed by determining whether the distance between the vehicle 105 at the given future timestep T' (e.g., the vehicle 105 at the predicted vehicle location indicated by the predicted future vehicle state $\delta_T$) and detected objects in the environment 100 is smaller than a defined distance threshold. Detected objects and their locations in the environment 100 may be indicated in the environment map obtained at step 352. In examples where detected objects in the environment 100 include dynamic objects (e.g., other moving vehicles, pedestrians, etc.), the environment map may also include predicted trajectories of the dynamic objects. In some examples, the risk prediction system 310 may also perform extrapolation to predict the location of such dynamic objects at the given future timestep T'. The defined distance threshold may be a variable distance threshold, which may vary depending on vehicle speed at the given future timestep T' for example (e.g., the defined distance may be larger when the vehicle speed is higher). The defined distance threshold is a numerical value indicating the minimum safe distance between the body of the vehicle 105 (e.g., defined based on the known 3D model of the vehicle 105) and any object in the environment 100. If the distance between the vehicle 105 at the given future timestep T' and any detected object in the environment 100 is smaller than the defined distance threshold, a risk of being too close to another object is predicted at that given future timestep T'.

Another defined risk check may be a check to determine whether the vehicle 105 at the given future timestep T' is at risk of loss of control. This risk check may be performed by determining whether the sensed trajectory (e.g., the trajectory predicted by the ADAS 340, using sensor data) differs significantly (e.g., differs by more than a noise threshold) from the intended trajectory of the vehicle 105 (e.g., the trajectory that is computed based on the steering control), and whether the yaw angle (i.e., the heading angle of the vehicle 105) or the yaw rate (i.e., the rate of change in heading angle) differs significantly (e.g., differs by more than a noise threshold) between the sensed trajectory compared to the intended trajectory. For example, a sensed trajectory and yaw angle may be predicted for each defined future timestep using the predicted trajectory from the ADAS 340, and a sensed rate of change of the yaw angle may be also computed for each defined future timestep. Then, an intended trajectory and yaw angle is predicted for each defined future timestep, based on the steering angle at the current timestep (e.g., as indicated in the current vehicle state), and an intended rate of change of the yaw angle may be also computed for each defined future timestep. If the sensed trajectory (computed using the predicted trajectory from the ADAS 340) at the given future timestep T' differs significantly from the intended trajectory (computed based on the steering angle at the current timestep), then this may indicate that vehicle 105 is not moving in the direction that is intended (e.g., based on the steering control) and a risk of loss of control is predicted at that given future timestep T'. If the sensed rate of change of the yaw angle at the given future timestep T' differs significantly from the intended rate of change of the yaw angle, then this may also indicate that vehicle 105 is not moving in the direction that is intended (e.g., based on the steering control) and a risk of loss of control is predicted at that given future timestep T'.

Another defined risk check may be a check to determine whether the vehicle 105 at the given future timestep T' is at risk of over speeding. A risk of over speeding means that the vehicle 105 is at risk of travelling at a speed that is too high for the environment 100, such as being at too high a speed to safely negotiate an upcoming intersection, curvature or elevation, or being at a speed that would result in collision with another vehicle in front of the vehicle 105. This risk check may be performed by determining whether the vehicle linear speed in the predicted future vehicle state ($\delta_T$, is greater than a defined speed threshold. The defined speed threshold may vary depending on the predicted trajectory, the detected road geometry in the environment map and/or the estimated speed of another vehicle in front of the vehicle 105 in the same lane. For example, the defined speed threshold may be a maximum safe speed for negotiate a curve in the road, which may be defined based on an empirically determined relationship between vehicle speed and road curvature. In another example, the defined speed threshold may be the estimated speed of the other vehicle in front of the vehicle 105. If the vehicle linear speed at the given future timestep T' is greater than the defined speed threshold, a risk of over speeding is predicted at that given future timestep T'.

Another defined risk check may be a check to determine whether the vehicle 105 at the given future timestep T' is at risk of a collision. This risk check may be performed by computing a future trajectory of the vehicle 105 from the given future timestep T' to the next future timestep T'+1. The future trajectory of the vehicle 105 from T' to T'+1 may be computed by computing a straight line segment from the predicted location of the vehicle 105 in the predicted vehicle state ($\delta_{T'}$, to the predicted location of the vehicle 105 in the next predicted vehicle state $\delta_{T'+1}$. Then, assuming that the vehicle 105 travels along the computed straight line, a determination may be made whether a 3D model of the vehicle 105 moving along the computed straight line would intersect with or abut any detected objects in the environment 100. If the detected objects include dynamic objects, an estimated trajectory of the dynamic objects from T' to T'+1 may be computed, in order to determine whether there would be an intersection with the vehicle 105. If the vehicle 105 is found to intersect or abut any objects in the environment 100 over the future trajectory from T' to T'+1, a risk of collision is predicted at the given future timestep T'.

Some examples of defined risk checks are described above, however these are not intended to be limiting. The above-described and/or other risk checks may be used to predict risky scenarios such as driving in cross-winds, snowy or slippery road conditions, low overhead structure ahead, driving through a narrow road, driving through a curvy road, or head-in parking, among others.

If any of the defined risk checks, when applied to the future vehicle state at the given future timestep T', predicts any risk, then a risk is predicted for the given future timestep T'. The risk checks may or may not be applied to subsequent future timesteps T'+k.

In some examples, steps 356 and 358 may be performed by performing a simulation of how the vehicle 105 is predicted to interact with the environment 100. For example, the future state of the vehicle 105 at each given future timestep may be determined based on the simulated interaction between the vehicle 105 (e.g., a simulation of the vehicle 105 based on the 3D model of the vehicle 105, which may be provided by the manufacturer) and the virtual reconstruction of the environment 100 (e.g., generated by the virtual environment reconstruction system 350). Then, a predicted risk may be determined based on the simulated future state of the vehicle 105 in the virtual reconstruction of the environment 100. For example, if the simulated future state of the vehicle 105 at a given future timestep reflects an abnormal or unexpected state, a risk may be predicted for that given future timestep. For example, if the simulated future state of the vehicle 105 at the given future timestep is not within a normal or permitted range (such as the angular velocity being outside normal range for the vehicle 105), a risk may be predicted. In another example, if the simulated future state of the vehicle 105 at the given future timestep does not substantially correspond to an expected future vehicle state (e.g., based on an ideal extrapolation of the current vehicle state), a risk may be predicted. For example, if the simulated future state of the vehicle 105 indicates that the vehicle 105 has stopped at the given future timestep and this does not correspond to the extrapolation based on the current speed and acceleration of the vehicle 105, a risk may be predicted (e.g., unexpected stopping of the vehicle 105 may be due to a simulated collision with a static or dynamic object in the virtual reconstruction). The prediction of risk may be performed using a simulation of the vehicle 105 in the virtual reconstruction of the environment 100, in addition to performing one or more of the defined risk checks as described above. It should also be understood that one or more of the defined risk checks may be performed using the simulation of the vehicle 105 in the virtual reconstruction of the environment 100 (e.g., by determining whether the simulation of the vehicle 105 is too close to an object in the virtual reconstruction of the environment 100 at any given future timestep).

Optionally, at 360, a predicted risk may be determined based on detecting an activation of a safety system. For example, activation of an electronic traction control system or an electronic stability control system may be considered an indicator of risk (e.g., a risk of oversteering or understeering). The safety system may be part of the ADAS 340, and indication of the activation of the safety system may be included in information obtained from the ADAS 340. If the activation of a safety system is detected, then the predicted risk may be determined for the current timestep.

Regardless of how step 354 is performed, if a risk is predicted, the method 350 proceeds to step 362. If no risk is predicted, the method 350 proceeds to step 364.

At 362, AR feedback is generated, including a virtual vehicle representing a predicted future vehicle state. The AR feedback may be generated by the AR renderer 320, using information provided by the risk prediction system 310. For example, the risk prediction system 310 may output to the AR renderer 320 an indication of the type of risk predicted and the timestep at which the predicted risk is found.

The predicted future vehicle state represented by the virtual vehicle in the AR feedback may correspond to the future timestep for which the risk is predicted. In some examples, if the predicted risk is for a current timestep (e.g., activation of a safety system is detected), the predicted future vehicle state may correspond to the maximum future timestep in the defined number of future timesteps Q. Further details about generating the AR feedback including the virtual vehicle will be described with reference to FIG. 4.

Following step 362, the method 350 returns to step 352 to process the next timestep. Depending on the capabilities of the sensor units 110, 140 and the processing system 102, each timestep may be separated by an interval of 1 s, 500 ms, 100 ms or shorter. It should be understood that the method 350 is performed in real-time or near real-time (e.g., within 100 ms, as data is generated based on sensing the physical environment 100 and as the vehicle 105 moves in the physical environment 100), so that risk prediction and AR feedback is performed with little or no latency, to provide driver assistance in a timely manner. In particular, it should be appreciated that the AR feedback should be generated in real-time or near real-time to enable the driver to take corrective actions to avert a predicted risk.

Returning to step 356, if no risk is predicted, the method 350 proceeds to step 364.

At 364, it is determined whether a risk was predicted at a previous timestep (i.e., if the current timestep is T, a determination is made whether a risk was predicted at timestep T−1). This determination may be made by querying a risk indicator (e.g., a binary flag) for the previous timestep. The determination may also be made by querying whether AR feedback was generated for the previous timestep.

If there was no risk predicted at the previous timestep, then the method 350 returns to step 352 to process the next timestep.

If there was a risk predicted at the previous timestep, then the determination that there is no risk at the current timestep means that the previously predicted risk has been averted. The method 350 then proceeds to step 366.

At 366, the AR feedback is ended. For example, the risk prediction system 310 may output an indication to the AR renderer 320 that the AR feedback should end. The AR renderer 320 may perform operations such that the AR feedback ends gradually (e.g., a gradual fade-out of the virtual vehicle) rather than ending abruptly. It may be useful for the AR feedback to end gradually, to avoid startling or confusing the driver. Various techniques may be used to end the AR feedback, including techniques such as a gradual fade-out. In some examples, if the vehicle 105 is stopped or turned off, the AR feedback may end more abruptly. Further details are described with reference to FIG. 6.

Following step 366, the method 350 returns to step 352 to process the next timestep.

Figure 4:
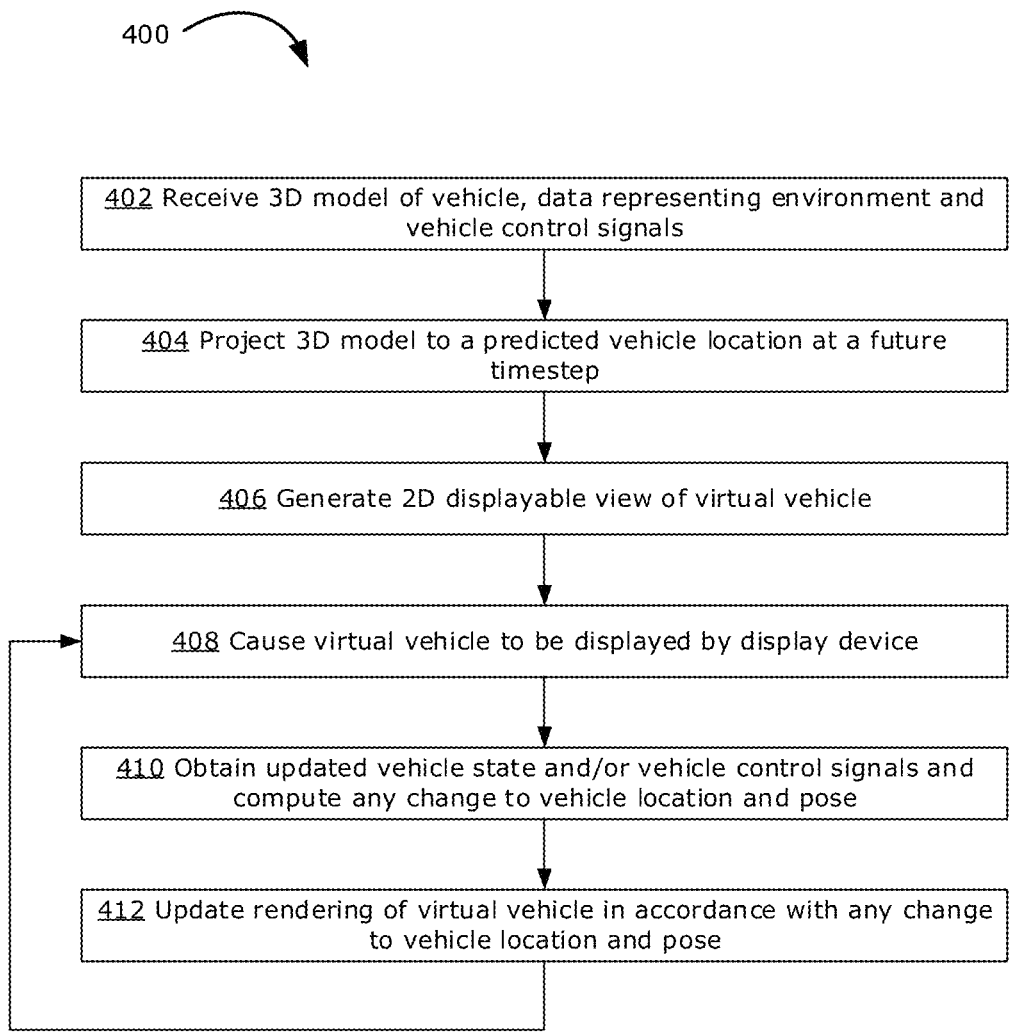
FIG. 4 is a flowchart illustrating an example method for generating AR feedback including a virtual vehicle, in accordance with examples of the present disclosure.

Reference is now made to FIG. 4, which is a flowchart illustrating an example method 400 for generating AR feedback. The method 400 may be performed by the vehicle control system 115 (e.g., using the AR renderer 320), to perform step 254 of the method 250 or step 362 of the method 350 for example.

In the following discussion, steps 402 to 406 may be performed only when AR feedback is initiated (e.g., in response to a predicted risk, when no risk was previously predicted; or in response to a user selecting an option to start AR driver assistance).

At 402, the AR renderer 320 receives inputs that may include the 3D model of the vehicle 105, data representing the environment 100 (e.g., received from the ADAS 340) and vehicle control signals (e.g., from the drive control system 150). In some examples, the AR renderer 320 may store a 3D model of the vehicle 105 and may not need to receive the 3D model of the vehicle 105. In general, the 3D model of the vehicle 105 may represent the vehicle 105 exactly or almost exactly (e.g., having the same or similar dimensions, color, make, etc.). The AR renderer 320 may include or can have access to application to draw the 3D model of the vehicle 105, for example. The data representing the environment 100 may be the 3D map of the environment 100 generated by the ADAS 340 and/or the virtual environment reconstruction system 350, and may also include image data such as image data from a forward-facing camera unit 112. The vehicle control signals may include control signals for controlling a steering angle, acceleration, etc.

At 404, the 3D model of the vehicle 105 is projected to a predicted location of the vehicle 105 (simply referred to as a predicted vehicle location) at a future timestep in the environment 100. For example, the future timestep may be the future timestep at which a predicted risk is predicted to occur. In another example, if a predicted risk corresponds to a current timestep (e.g., a risk is predicted based on activation of a safety system at a current timestep), the future timestep for projecting the 3D model may be the defined number of timesteps Q (which may be dependent on the linear speed of the vehicle 105, as discussed above).

The 3D coordinates of the projected 3D model of the vehicle 105 are determined based on the predicted future vehicle state at the future timestep. The 3D coordinates of the projected 3D model may be represented as 3D coordinates (x, y, $d_{Vz}$) in the environment frame of reference, where $d_{Vz}$ denotes the projection distance of the 3D model.

The projection distance is a distance ahead of the vehicle 105 that corresponds to the distance predicted to be travelled by the vehicle from the current timestep to the future timestep. The projection distance may be extracted from the predicted future vehicle state at the future timestep. In another example, the projection distance may be computed by multiplying the current linear speed of the vehicle 105 with the time duration between the current timestep and the future timestep.

At 406, a 2D displayable view of the virtual vehicle is generated. A 2D displayable view, in the present disclosure, means a view of the 3D virtual vehicle that is displayable by a 2D display (such as the display device 136). For example, the 3D virtual vehicle may be projected to a 2D plane in order to generate the 2D displayable view of the virtual vehicle. This may involve first computing a conversion from the environment (or world) frame of reference to a 2D display frame of reference. This helps to ensure that the virtual vehicle is rendered to appear to be driving in the environment 100, when viewed via the display device 136. The environment frame of reference may be, for example, the coordinate system defined by the 3D map of the environment 100, and the 2D display frame of reference may be, for example, the coordinate system defined by front-facing image data (e.g., captured by a front-facing camera unit 112).

Various techniques may be used to compute the conversion from the environment frame of reference to the 2D display frame of reference. For example, stationary reference marks (e.g., landmark buildings, lane markings, curbs, etc.) may be identified in the 3D map of the environment 100 and also in the front-facing image data (e.g., may be identified by the ADAS 340 using suitable object detection and segmentation algorithms). In some examples, a predefined and prepopulated high-definition 3D map may also be used provide landmark information. The 3D coordinates of the reference marks in the 3D map may then be mapped to the 2D coordinates of the reference marks in the front-facing image data, to compute the conversion from the environment frame of reference to the 2D display frame of reference. The computed conversion may include a projection of 3D coordinates onto the 2D plane of the front-facing image data.

In some examples, if the display device 136 is a wearable device (e.g., HMD or smartglasses), the tracked position of the wearable device (e.g., corresponding to the position and pose of the wearer's head) may also be indicated in tracking data (e.g., generated by an accelerometer, gyroscope, etc. of the wearable device; or by sensors external to the wearable device that track the position and pose of the wearable device). The tracking data may enable computation of the view of the wearer relative to the front-facing image data (since the wearer can move their head and hence change the view that should be displayed by the wearable device independently from the position and pose of the vehicle 105). The 3D coordinates of the 3D map should be updated to match the 2D display frame of reference of the wearable device, while accounting for the tracking data. For example, the 3D coordinates may be initially mapped to a 2D display frame of reference that corresponds to the wearer being front-facing and centered. Then, if the wearer shifts leftwards (as indicated in the tracking data), the mapping of the 3D coordinates should be updated to reflect the shift in the 2D display frame of reference to the left.

The 2D displayable view of the virtual vehicle may then be generated by converting the 3D coordinates of the projected 3D model in the environment frame of reference to the 2D coordinates of the 2D display frame of reference, in accordance with the computed conversion.

In some examples, the AR feedback generated by the AR renderer 320 may include one or more other virtual objects in addition to the virtual vehicle. The additional virtual object(s) may be dependent on the type of risk predicted. Further, the additional virtual object(s) may be generated to be displayed relative to the virtual vehicle (e.g., to be displayed at or near a portion of the virtual vehicle that is affected by the predicted risk).

For example, if the predicted risk is a risk of being too close to a detected object in the environment 100, the AR feedback may additionally include a virtual proximity indicator (e.g., a colored outline or colored block) representing the predicted distance between the virtual vehicle and the detected object that has been found to be too close. The virtual proximity indicator may be generated to be displayed relative to the side of the virtual vehicle that is predicted to be too close to the detected object. In another example, if the predicted risk is a risk of collision, the AR feedback may additionally include a virtual collision indicator (e.g., a collision symbol) representing the predicted collision between the virtual vehicle and the collided object in the environment 100. The virtual collision indicator may be generated to be displayed relative to the portion of the virtual vehicle that is predicted to collide with the object. Other such additional virtual object(s) may be provided, examples of which are discussed further below.

Figure 5:
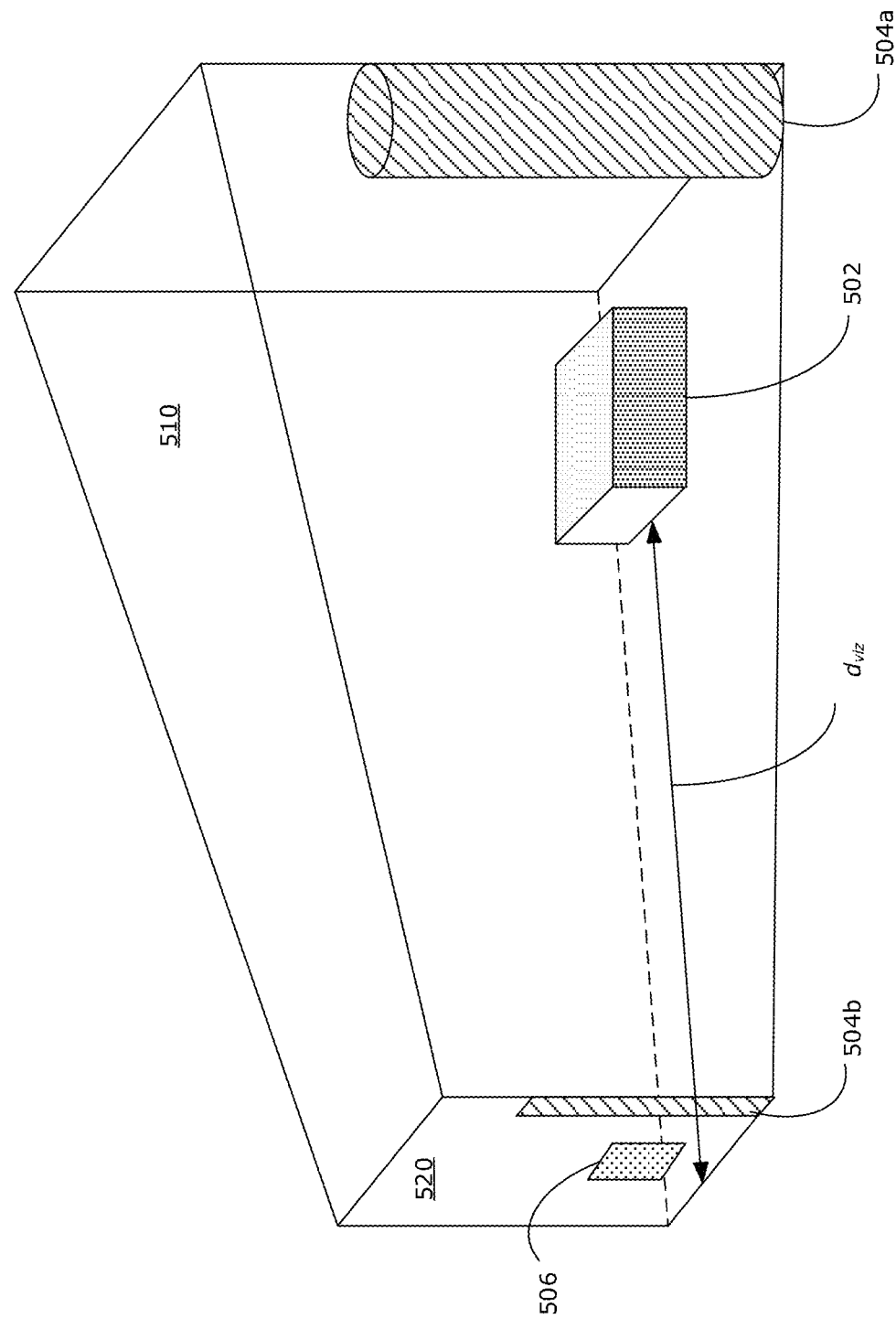
FIG. 5 illustrates a simple example of how a 3D virtual vehicle may be projected to a 2D displayable view for display by a display device, in accordance with examples of the present disclosure.

FIG. 5 illustrates a simple example of how the 2D displayable view of the virtual vehicle may be generated, in accordance with step 406.

In this example, the 3D model 502 of the vehicle 105 is at the 3D coordinates $(x, y, d_{Vi_z})$. The 3D map 510 of the environment 100 includes a detected reference mark 504a. A corresponding detected reference mark 504b is also found in the front-facing 2D image 520. By mapping the 3D coordinates of the reference mark 504a in the 3D map 510 to the 2D coordinates of the reference mark 504b in the 2D image 520, a conversion from the 3D coordinates of the 3D map 510 to the 2D coordinates of the 2D image 520 may be computed. Using the computed conversion, the 3D coordinates $(x, y, d_{Vi_z})$ of the 3D model 502 is then mapped to 2D coordinates of a 2D displayable view of the virtual vehicle 506, which may be used to generate an AR visualization of the virtual vehicle 506 in the plane of the 2D image 520. It should be noted that the plane of the 2D image 520 corresponds to the plane of 2D view provided by the display device 136. For example, if the display device 136 is a HUD unit that projects AR feedback on the windshield, the plane of the 2D image 520 may correspond to the plane of the windshield. If the display device 136 is a dashboard display, the plane of the 2D image 520 may correspond to the image plane of the front-facing camera.

It should be noted that, as the FOV of the 2D image 520 changes (e.g., due to movement of the vehicle 105 and/or movement of the wearer's head in the case where the display device 136 is a head-worn device), the mapping of the 3D coordinates to the 2D coordinates should also be updated in real-time or near real-time. For example, in cases where the display device 136 is a wearable device, tracking data (e.g., indicating changes in position and pose of the wearer's head) may be used to update the mapping of the 3D coordinates.

Reference is again made to FIG. 4. After the 2D displayable view of the virtual vehicle has been generated once, subsequent rendering of the virtual vehicle may require only updating the virtual vehicle in the 2D display frame of reference, without requiring repeating steps 402 to 406.

At 408, the 2D displayable view of the virtual vehicle is outputted to cause the display device 136 to display the virtual vehicle. This provides AR feedback to the driver, where the virtual vehicle represents a predicted future location of the vehicle 105 in the environment 100.

After the virtual vehicle has been display once, steps 408 to 412 may be performed repeatedly (e.g., at each timestep) until the AR feedback ends (e.g., when the predicted risk has been averted).

At 410, the AR renderer 320 obtains an updated vehicle state (e.g., vehicle state at a next current timestep) and/or updated vehicle control signals (e.g., updated steering control signal, updated accelerator signal, etc. at a next current timestep). Using the updated vehicle state and/or control signals, any change in the location and/or pose of the virtual vehicle is computed. In some examples, updated vehicle control signals may be implicitly or explicitly included in the updated vehicle state (e.g., an updated steering control signal may be implicitly included in an updated vehicle pose in the updated vehicle state).

For example, if the updated vehicle control signal indicates that the steering angle has changed, the corresponding change in location and pose of the virtual vehicle is computed. In some examples, the change in location and/or pose of the virtual vehicle may be computed by determining how the updated vehicle control signals would change the 3D model in the 3D environment, then converting the change from 3D coordinates to 2D coordinates using the computed conversion from the environment frame of reference to the 2D display frame of reference.

At 412, the rendering of the virtual vehicle is updated in accordance with the computed change in location and/or pose.

The method 400 then returns to step 408 to cause the virtual vehicle to be displayed by the display device 136.

Figure 6:
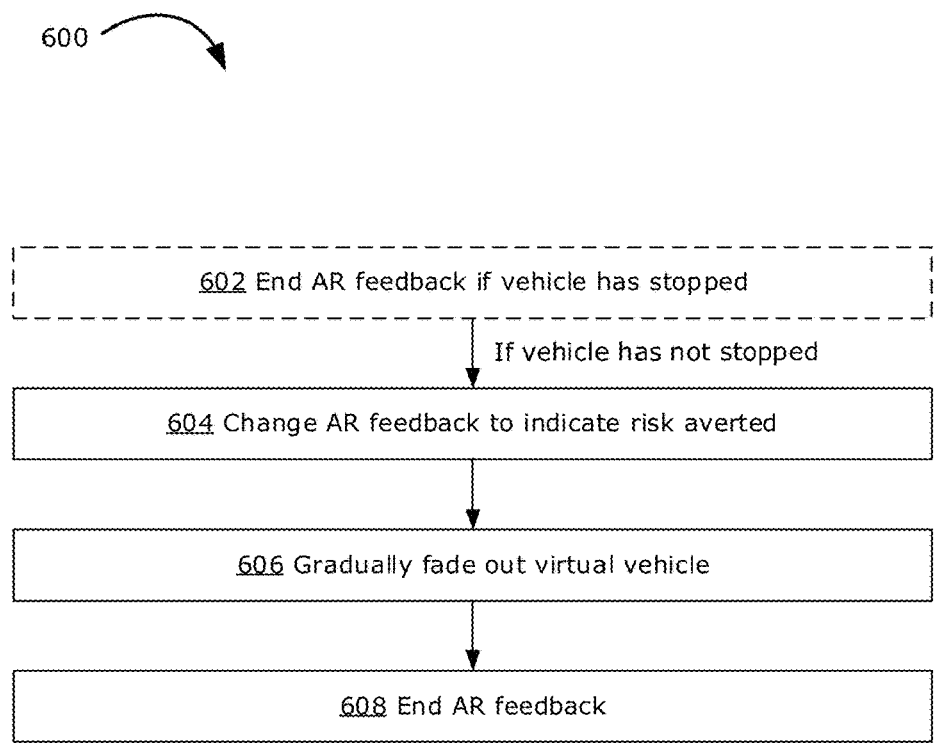
FIG. 6 is a flowchart illustrating an example method for ending AR feedback, in accordance with examples of the present disclosure.

Reference is now made to FIG. 6, which is a flowchart illustrating an example method 600 for ending AR feedback. The method 600 may be performed by the vehicle control system 115 (e.g., using the AR renderer 320), to perform step 366 of the method 350 for example.

The AR renderer 320 may, for example, receive input from the risk prediction system 310 indicating that a previously predicted risk has been averted. This may cause the AR renderer 320 to end the AR feedback. Alternatively, the decision to end the AR feedback may be made by the risk prediction system 310, and the AR renderer 320 may simply receive input to end the AR feedback.

Optionally, at 602, if the vehicle 105 has stopped or the ignition has turned off, the AR feedback may simply end, and the method 600 may end.

At 604, the AR feedback is changed to indicate the previously predicted risk has been averted. As previously described, the AR feedback may include additional virtual object(s) dependent on the type of risk predicted. For example, a virtual proximity indicator may be included if a risk of being too close to an object is predicted; in another example, a virtual collision indicator may be included is a risk of collision is predicted. The additional virtual object(s) may be updated to indicate the risk has been averted. For example, a virtual proximity indicator may change color from red (indicating the predicted risk) to green (indicating risk averted). In another example, a virtual collision indicator may change from a collision symbol (indicating the predicted risk) to an okay symbol (indicated risk averted) or may be simply removed. Other such changes to the additional virtual object(s) may be made, as discussed further below.

At 606, the virtual vehicle is gradually faded out. For example, the AR renderer 320 may continue to render the virtual vehicle for the next few timesteps (e.g., next three or next five timesteps) in accordance with the method 400, but with increasing transparency until the virtual vehicle is completely transparent (and thus no longer displayed by the display device 136). Any other additional virtual object(s) indicating the previously predicted risk may be similarly faded out.

At 608, the AR feedback is ended. This may end all AR feedback, or may end only the AR feedback related to the previously predicted risk. For example, if navigational AR feedback (which is not related to a predicted risk) is also displayed by the display device 136, the navigational AR feedback may continue to be displayed.

It should be understood that the steps of the methods 250, 350, 400 and 600, although described as being performed by the risk prediction module 310 or the AR renderer 320, may be performed by any one or more modules of the vehicle control system 115. For example, functions that are described as being performed by the risk prediction module 310 may instead be performed by the AR renderer 320, and vice versa. As well, functions that are described as being performed by the ADAS 340 may be performed by other modules of the vehicle control system 115.

Some examples of how the virtual vehicle may be rendered by the AR renderer 320, and examples of additional virtual object(s) related to a predicted risk are now described. It should be understood that these examples are not intended to be limiting, and other AR visualizations related to a predicted risk may be within the scope of this disclosure.

Figure 7A:
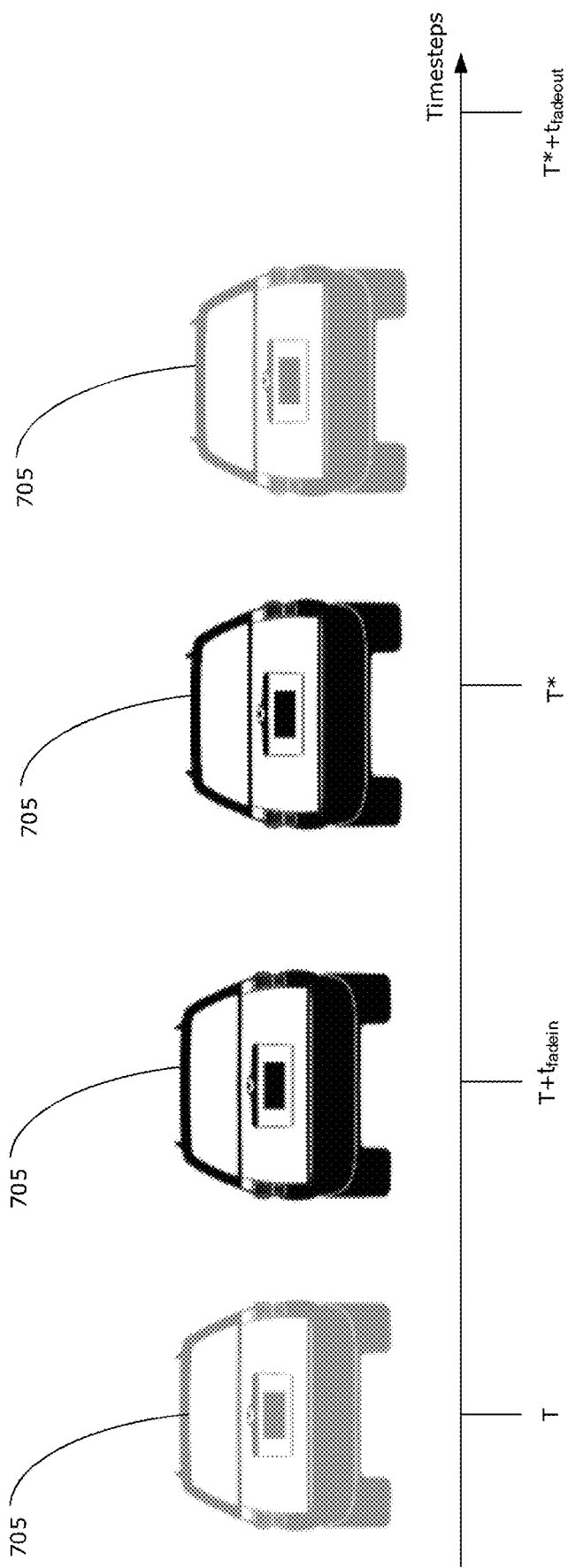
FIGS. 7A-7G illustrate examples of how AR feedback including a virtual vehicle may be rendered and displayed by a display device.

FIG. 7A illustrates an example of how the virtual vehicle may be rendered and displayed by the display device 136.

The virtual vehicle 705 may be rendered in various ways, which may be preset (e.g., by the manufacturer of the vehicle 105), may be selectable by the driver and/or may be automatically adjusted by the AR renderer 320 in response to the environment 100 (e.g., depending on ambient light, night or day conditions, etc.). The virtual vehicle 705 may be rendered with a range of details, for example ranging from a simply outline or wireframe model of the vehicle 105 to a fully detailed virtual replica of the vehicle 105.

In the example of FIG. 7A, the virtual vehicle 705 is rendered as a wireframe model of the vehicle 105. The virtual vehicle 705 is rendered in a way that, when displayed by the display device 136, the virtual vehicle 705 appears as a leading vehicle ahead of the driver. However, the virtual vehicle 705 is not a navigational aid demonstrating a path for the driver to follow, but rather is a projection of the driver's current handling of the vehicle 105 and the virtual vehicle 705 is updated in real-time to reflect the actual handling of the vehicle 105.

As previously mentioned, the virtual vehicle 705 may be gradually faded out when the predicted risk has been averted. Similarly, the virtual vehicle 705 may gradually increase in opacity when a risk is predicted. For example, as shown in FIG. 7A, at time T when a risk is predicted (by the risk prediction system 310), the virtual vehicle 705 is rendered to be close to fully transparent (e.g., 75% transparency). Over a few timesteps (e.g., from T to T+$t_{fadein}$), the opacity of the virtual vehicle 705 may be increased until the virtual vehicle 705 is at a defined opacity (e.g., 25% transparency). The virtual vehicle 705 may continue to be rendered at the defined opacity until the risk has been averted (as determined by the risk prediction system 310) at timestep T*. Over the next few timesteps (e.g., from T* to T*+$t_{fadeout}$), the transparency of the virtual vehicle 705 is decreased until the virtual vehicle 705 is completely removed. It should be noted that the fade in, fade out, and transparency/opacity of the virtual vehicle 705 may be adjustable. For example, the initial transparency of the virtual vehicle 705 (e.g., at timestep T), the final transparency/opacity of the virtual vehicle 705 (e.g., at timestep T+$t_{fadein}$), the number of timesteps for the fade in (e.g., $t_{fadein}$) and the number of timesteps for the fade out (e.g., $t_{fadeout}$) may all be individually adjustable parameters (e.g., selectable by the driver).

In some examples, visual aspects of the virtual vehicle 705 (e.g., the fade in, fade out and transparency/opacity of the virtual vehicle 705) may be automatically adjusted by the AR renderer 320, in response to detected environmental conditions (e.g., detected by environment sensors 110). For example, in low-lighting or nighttime conditions, the number of timesteps for the fade in and the final opacity of the virtual vehicle 705 may be increased, to enable easier viewing of the virtual vehicle 705. In another example, if there is a large number of detected objects in the environment 100 (e.g., as indicated by the 3D map of the environment generated by the ADAS 340), the virtual vehicle 705 may be rendered with higher transparency to avoid blocking the driver's view of objects in the environment 100.

Figure 7B:
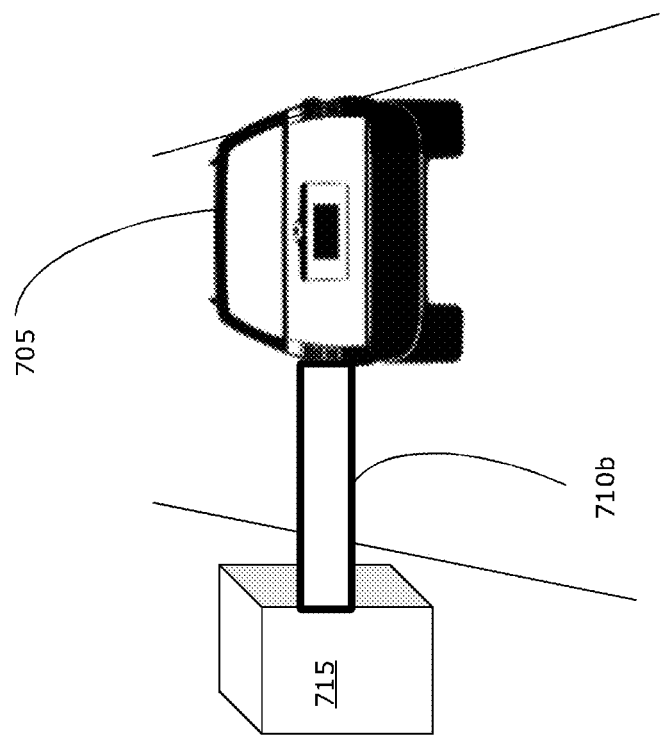
Figure 7B:
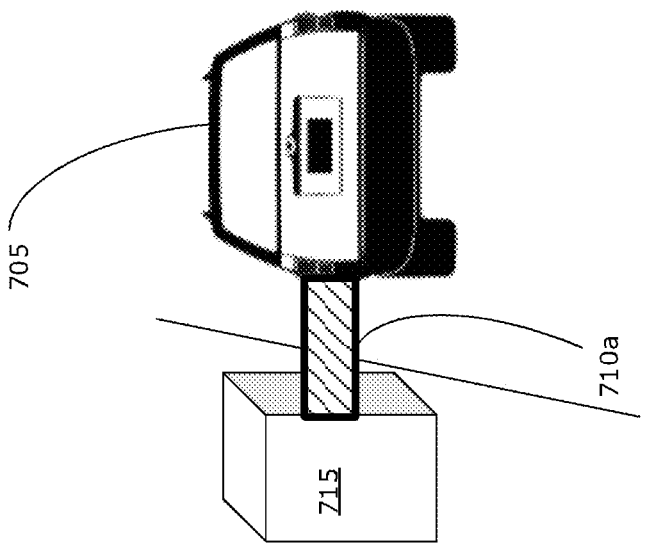

FIG. 7B illustrates another example of how the virtual vehicle 705 may be rendered and displayed by the display device 136, in the case where a risk of being too close to an object has been predicted. In particular, the AR feedback includes a virtual proximity indicator.

In this example, the risk prediction system 310 has predicted a risk of being too close to an object 715 in the environment 100. The AR renderer 320 is provided with a 3D map of the environment 100, an indication of the type of predicted risk (e.g., a risk category label) and an indication of the object 715 associated with the predicted risk (e.g., an object identifier assigned to the detected object 715 in the 3D map).

Using the received information, the AR renderer 320 generates the virtual vehicle 705 and also generates a virtual proximity indicator 710a. In this examples, the fade in of the virtual vehicle 705 is not shown, but may be performed (e.g., as shown in FIG. 7A) for the virtual vehicle 705 and/or the virtual proximity indicator 710a. The virtual proximity indicator 710a in this example is a colored bar that represents the proximity between the virtual vehicle 705 (which represents the future location of the vehicle 105 at a future timestep where the risk is predicted) and the object 715. The virtual proximity indicator 710a is generated to be displayed relative to the side of the virtual vehicle 705 that is predicted to be too close to the object 715. The virtual proximity indicator 710a may be colored in red (indicated by shading in FIG. 7B) to indicate the risk.

At a following timestep, the vehicle 105 is maneuvered away from the object 715 (e.g., by the driver changing the steering angle). Based on the change in steering, the risk prediction system 310 predicts that the risk has been averted. The AR renderer 320 is provided with an indication that the risk has been averted and the change in steering (the previous information including the 3D map of the environment 100, indication of the type of predicted risk and indication of the object 715 may be provided again or may not need to be provided again to the AR renderer 320).

Using the received information, the AR renderer 320 updates the position of the virtual vehicle 705 and also updates the virtual proximity indicator 710b to indicate that the risk has been averted. For example, the color of the virtual proximity indicator 710b may be changed to green (indicating by no shading in FIG. 7B).

Assuming that the vehicle 105 continues to be maneuvered away from the object 715, the virtual vehicle 705 and the virtual proximity indicator 710b may subsequently be faded out.

The example AR feedback illustrated in FIG. 7B may enable a proximity risk to be visualized in a way that provides assurance to the driver that they have successfully averted the risk (e.g., by updating the virtual proximity indicator from a red to a green color).

Figure 7C:
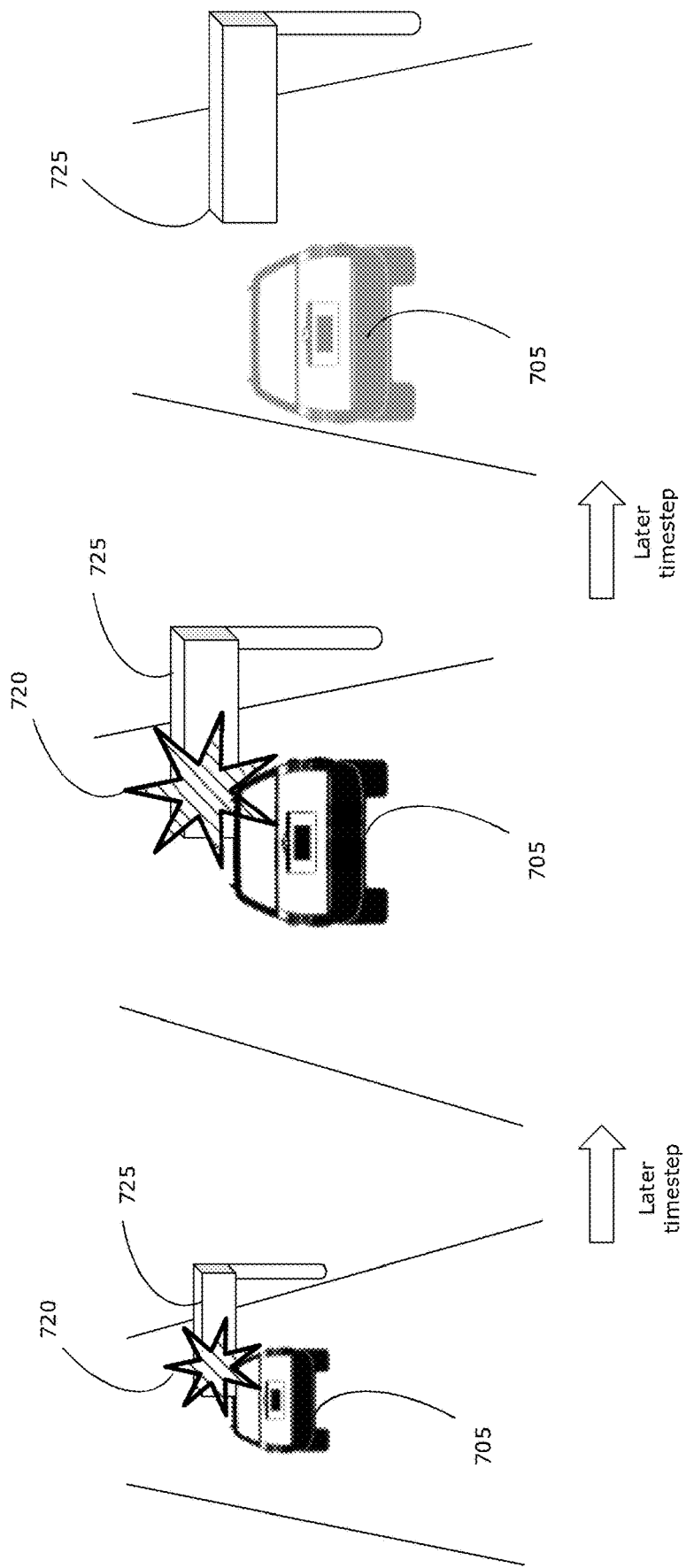

FIG. 7C illustrates another example of how the virtual vehicle 705 may be rendered and displayed by the display device 136, in the case where a risk of collision has been predicted. In particular, the AR feedback includes a virtual collision indicator.

In this example, the risk prediction system 310 has predicted a risk of colliding with an object 725 in the environment 100. The AR renderer 320 is provided with a 3D map of the environment 100, an indication of the type of predicted risk (e.g., a risk category label) and an indication of the object 725 associated with the predicted risk (e.g., an object identifier assigned to the detected object 725 in the 3D map).

Using the received information, the AR renderer 320 generates the virtual vehicle 705 and also generates a virtual collision indicator 720 (e.g., a crash symbol). The virtual collision indicator 720 may be any symbol or icon and/or may include text to indicate the risk of collision. The virtual collision indicator 720 is generated to be displayed relative to the portion of the vehicle that is predicted to collide with the object 725. In this examples, the virtual vehicle 705 is rendered for the future timestep when the risk of collision is predicted, which initially may be at a farther projected distance.

At a following timestep, the vehicle 105 control is unchanged and the risk of collision continues to be predicted by the risk prediction system 310. The AR renderer 320 thus continues to generate the virtual vehicle 705 for the future timestep when the risk of collision is predicted, which is now at a closer projected distance (reflecting the fewer number of timesteps until the collision is predicted to occur).

At a following timestep, the vehicle 105 is maneuvered away from the object 725 (e.g., by the driver changing the steering angle). Based on the change in steering, the risk prediction system 310 predicts that the risk has been averted. The AR renderer 320 is provided with an indication that the risk has been averted and the change in steering. Using the received information, the AR renderer 320 updates the position of the virtual vehicle 705, updates (e.g., removes) the virtual collision indicator 720 and may also increase the transparency of the virtual vehicle 705 (to eventually fade out the virtual vehicle 705).

Figure 7D:
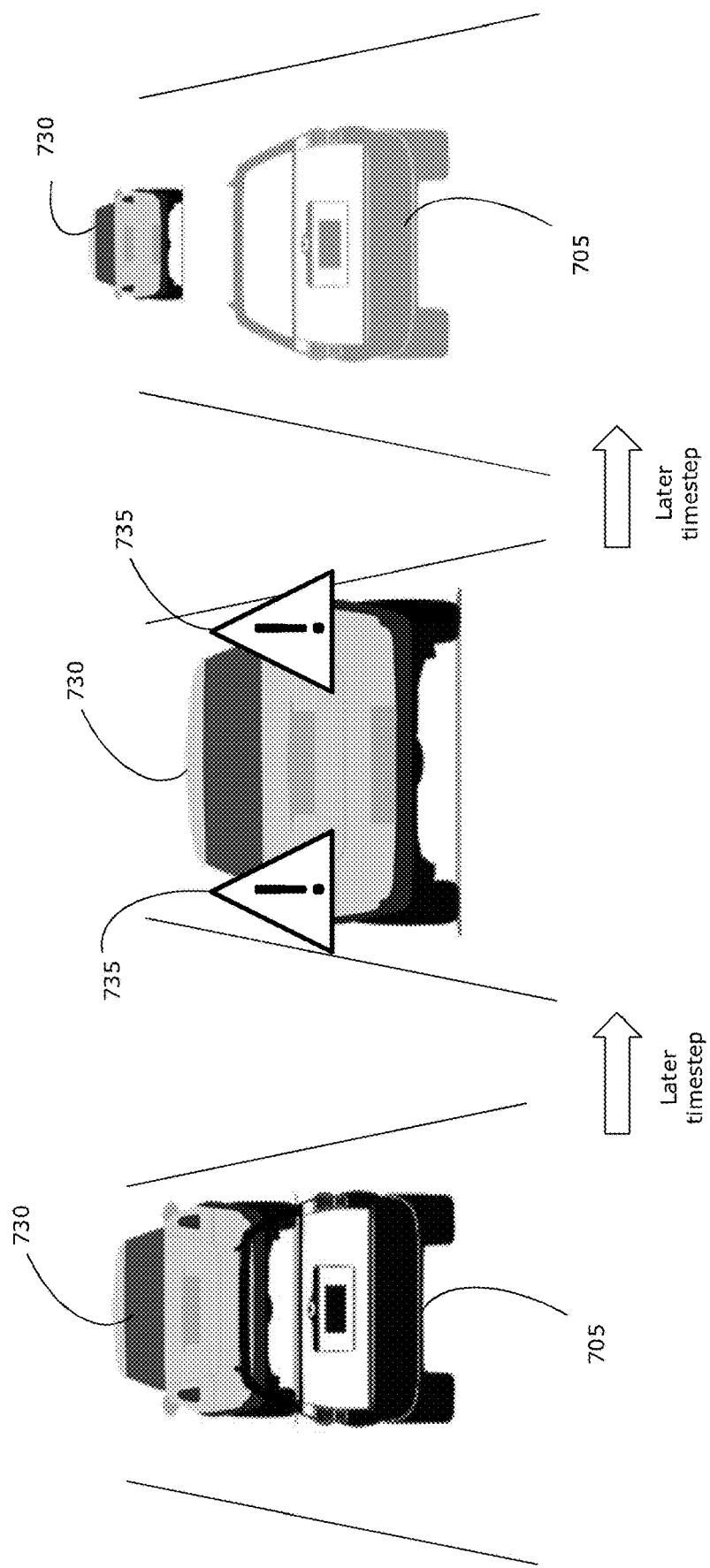

FIG. 7D illustrates another example of how the virtual vehicle 705 may be rendered and displayed by the display device 136, in the case where a risk of over speeding has been predicted with respect to another vehicle in the environment 100.

In this example, the risk prediction system 310 has predicted a risk of over speeding that would result in rear-ending another vehicle 730 in the environment 100. The AR renderer 320 is provided with a 3D map of the environment 100, an indication of the type of predicted risk (e.g., a risk category label) and an indication of the other vehicle 730 associated with the predicted risk (e.g., an object identifier assigned to the detected vehicle 730 in the 3D map).

Using the received information, the AR renderer 320 generates the virtual vehicle 705. In this examples, the virtual vehicle 705 is rendered for the future timestep when the risk of over speeding is predicted, which initially may be at a future timestep when the vehicle 105 is predicted to be too close to the other vehicle 730 but not yet colliding with the other vehicle 730.

At a following timestep, the vehicle 105 control is unchanged and the risk prediction system 310 now predicts a risk of collision in addition to the risk of over speeding. The AR renderer 320 replaces the virtual vehicle 705 with virtual collision indicators 735, which in this example may be positioned to blend or superimpose the tail lights of the other vehicle 730. Replacing the virtual vehicle 705 with the virtual collision indicators 735 may enable the driver to more clearly see and understand the danger of rear-ending the other vehicle 730.

At a following timestep, the vehicle 105 is controlled to reduce speed (e.g., by the driver releasing the accelerator pedal or depressing the brake pedal). Based on the change vehicle control, the risk prediction system 310 predicts that the risk has been averted. The AR renderer 320 is provided with an indication that the risk has been averted and the change vehicle control (e.g., a change in vehicle acceleration and/or vehicle speed). Using the received information, the AR renderer 320 resumes rendering the virtual vehicle 705 with an updated position. The transparency of the virtual vehicle 705 may also be increased (to eventually fade out the virtual vehicle 705).

Figure 7E:
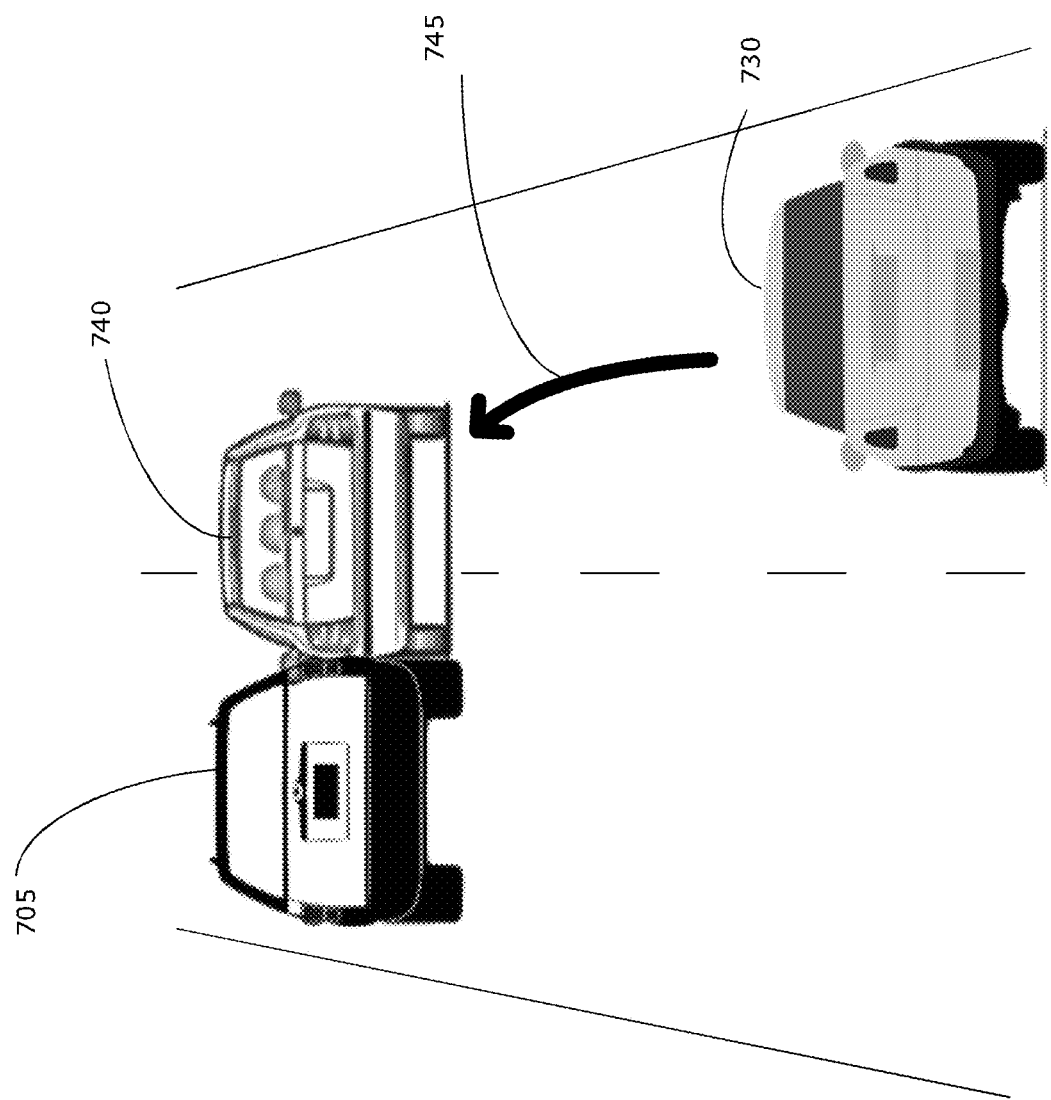

FIG. 7E illustrates another example of how the virtual vehicle 705 may be rendered and displayed by the display device 136, in the case where a risk of collision with a dynamic object has been predicted. In particular, the AR feedback includes a virtual representation of a predicted future location of a dynamic object in the environment.

In this example, the risk prediction system 310 has predicted a risk of collision with a dynamic object (in this case, another vehicle) in the environment, based on a predicted trajectory of the dynamic object. For example, the risk may be predicted based on a simulation in a virtual reconstruction of the environment that includes data representing how dynamic objects in the environment are predicted to move over one or more defined future timesteps. In this example, using data obtained from sensors, satellites and/or other vehicles (e.g., in a V2V communication network), the virtual environment reconstruction system 350 obtains information indicating that an actual other vehicle 730 in the environment (which is currently in a lane beside the ego-vehicle 105 at the current timestep) is performing a lane change into the same lane as the ego-vehicle 105. A simulation in the virtual reconstruction thus results in the ego-vehicle 105 colliding (e.g., a side collision as shown, or a rear collision or other type of collision) with the other vehicle at a future timestep. This prediction is provided to the AR renderer 320, together with the environment map (e.g., the virtual reconstruction that includes the predicted trajectory of the other vehicle 730) and an identifier of the other vehicle 760 (e.g., an object identifier assigned to the other vehicle 730 in the 3D map).

Using the received information, the AR renderer 320 generates the virtual vehicle 705 representing the ego-vehicle 105 at the future timestep when the collision is predicted. Further, the AR renderer 320 generates other virtual objects, in this case a virtual vehicle 740 representing the predicted location of the other vehicle 730 at the future timestep when the collision is predicted, and optionally a virtual arrow 745 representing the predicted trajectory of the other vehicle 730.

The AR feedback thus provides the driver of the ego-vehicle 105 with clear and explicit visualization of the predicted risk (i.e., a predicted collision), which may enable the driver to take appropriate action (e.g., slow down the vehicle 105 or change lane) to avert the predicted risk. It may be appreciated that by providing AR feedback that accurately and explicitly shows a predicted risk, rather than more abstract feedback (e.g., simply showing an arrow representing the predicted trajectory of the other vehicle), the driver may be able to more quickly understand the risk and take faster action in response.

Figure 7F:
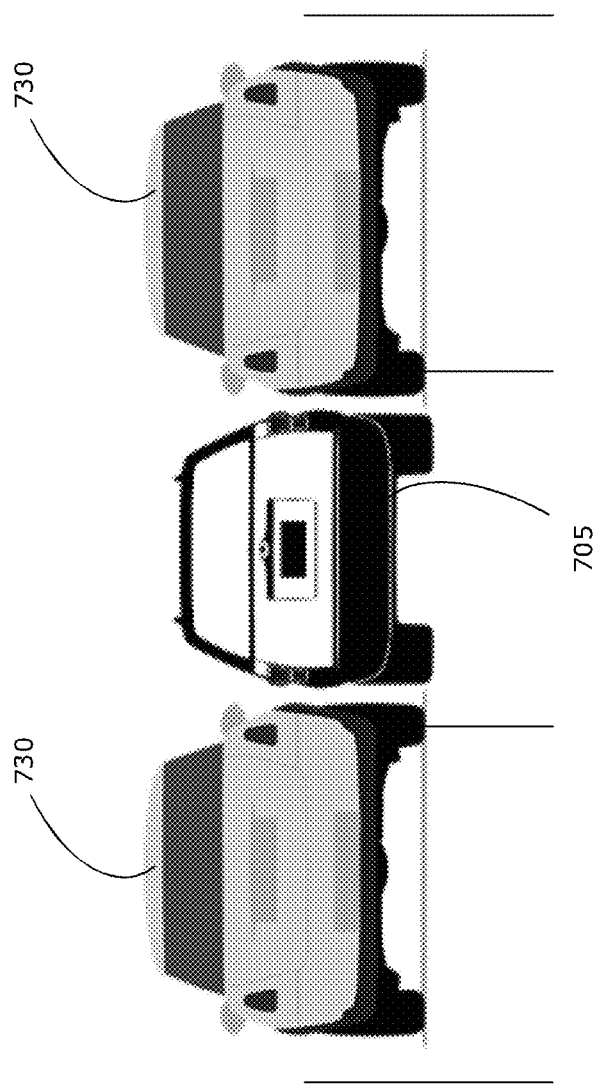

FIG. 7F illustrates another example of how the virtual vehicle 705 may be rendered and displayed by the display device 136, in the case where a risk of being too close to a detected object is predicted.

In this example, the AR feedback is provided in the context of an attempt to part the vehicle 105, where there are other vehicles 730 on either side of the intended parking spot. In this example, the risk prediction system 310 has predicted a risk of being too close to one or both of the other vehicles 730 (e.g., because one or both of the other vehicles 730 are parked in a way that obstructs the intended parking spot).

The AR renderer 320 is provided with a 3D map of the environment 100 and an indication of the type of predicted risk (e.g., a risk category label). Using the received information, the AR renderer 320 generates the virtual vehicle 705 representing the predicted position of the vehicle 105 at the future timestep when the risk of being too close has is predicted (e.g., when the vehicle 105 is parked in the intended parking spot). In this examples, the AR feedback does not include a proximity indicator (as shown in FIG. 7B), however a proximity indicator may also be included in the AR feedback.

Because the AR feedback includes a virtual vehicle 705 that is a realistic and true-to-life representation of the ego-vehicle 105, the driver of the ego-vehicle 105 is able to clearly and explicitly visualize that the ego-vehicle 105 would be too close to the other vehicles 730 if parked in the intended parking spot. This may enable the driver to take appropriate action (e.g., find another parking spot) to avert the predicted risk. It may be appreciated that by providing AR feedback that accurately and explicitly shows the virtual vehicle 705, rather than more abstract feedback (e.g., simply showing red lines or audio beeping to indicate proximity), the driver may be able to better understand the gravity of the risk. For example, a driver who is provided with abstract feedback such as audio beeping or red lines may trust their own intuition instead of the driver assistance feedback and attempt to fit into the intended parking spot, rather than fully understanding the predicted risk. However, a driver who is provided with explicit visualization of how close the vehicle 105 (as represented by the virtual vehicle 705) would be to the other vehicles 730 would be more likely to trust the driver assistance feedback instead of their own intuition.

As previously mentioned, the virtual vehicle 705 may be rendered and displayed for multiple timesteps. Thus, the AR feedback may show a rendering of the virtual vehicle 705 that moves along a predicted trajectory or that exhibits a predicted behavior. For example, the risk prediction system 310 may predict a risk based on a simulation, over one or more defined future timesteps, in a virtual reconstruction of the environment. The simulation includes a simulation of how the vehicle is predicted to behave in the virtual reconstruction of the environment, including how the vehicle is predicted to be affected by environmental conditions (e.g., icy conditions, presence of pothole, high winds, etc.). Accordingly, the AR feedback may show a rendering of the virtual vehicle 705 that exhibits the behavior that is predicted based on the simulation in the virtual reconstruction.

Figure 7G:
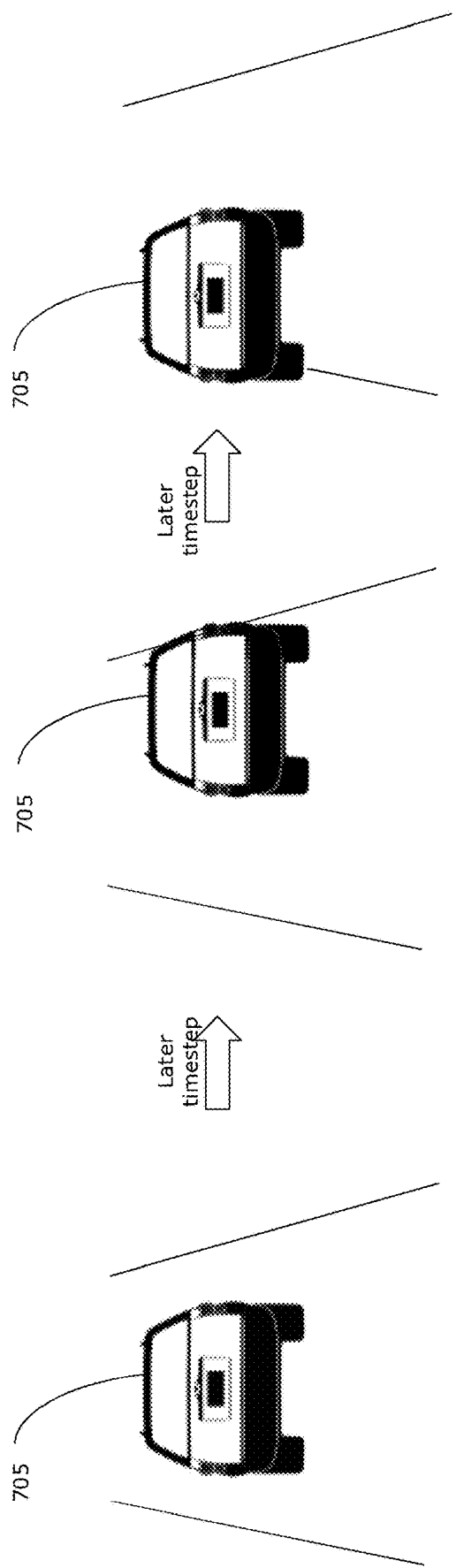

FIG. 7G illustrates another example of how the virtual vehicle 705 may be rendered and displayed by the display device 136, in the case where a risk of loss of control is predicted. In particular, the predicted risk may be based on a simulation in a virtual reconstruction of the environment, and the virtual vehicle 705 may be rendered in a way that shows movement (i.e., animation) of the virtual vehicle 705 based on the simulation.

The AR renderer 320 is provided with a 3D map of the environment 100 and an indication of the type of predicted risk (e.g., a risk category label). The AR renderer 320 is also provided with the predicted behavior or movement of the vehicle, in accordance with the simulation in the virtual reconstruction. For example, the virtual reconstruction may include a reconstruction of icy road conditions, and the simulation may predict sliding of the vehicle on an icy patch on the road. Using the received information, the AR renderer 320 generates the virtual vehicle 705 representing the predicted behavior of the vehicle 105 over two or more future timesteps during which the risk of loss of control has been predicted (e.g., over all future timesteps during which the simulation predicts the vehicle to have a loss of control).

As shown in FIG. 7G, the AR feedback shows the virtual vehicle 705 at a timestep when the loss of control is first predicted, followed by movement of the virtual vehicle 705 over subsequent timesteps that reflect the predicted loss of control (in this case, predicted sliding side to side due to icy road conditions) Optionally, the AR feedback may also include additional virtual objects, such as an arrow to indicate the predicted sliding.

It should be understood that the AR feedback may include other types of virtual objects, which may help to provide driver assistance in various scenarios. For example, if a risk of collision is predicted, the AR feedback may include a virtual object that shows a realistic (e.g., simulated using a physics engine) collision between the virtual vehicle and the detected object in the environment. In another example, if a risk of being too close or a risk of collision is predicted, the AR feedback may include a virtual object that highlights (or indicates in some other abstract manner) the portion of the virtual vehicle that is at risk. Other types of virtual objects may be used in the AR feedback.

In particular, the AR feedback may include rendered virtual objects, including the virtual vehicle representing the ego-vehicle, that provide explicit visualization of a predicted risk. The AR feedback may enable a driver to explicitly visualize what would occur in real-life if the predicted risk were to occur. Compared to conventional abstract driver assistance feedback, such realistic and explicitly visualization of a predicted risk may enable a driver to better understand and react faster to the predicted risk, thus helping the driver to avert the risk.

Some examples of predicted risk and corresponding AR feedback have been discussed above. It should be understood that the present disclosure may enable generation of AR feedback via the display device 136 in other risky scenarios. For example, a gust of wind or even a large vehicle passing in an adjacent lane can cause the vehicle 105 to momentarily deviate from its course. This risk may be predicted by the risk prediction system 310 when the yaw rate of the vehicle 105 is greater than the trajectory heading rate, or may be predicted by the risk prediction system 310 based on a simulation of the vehicle 105 in the virtual reconstruction of the environment 100 (which includes simulation of environment conditions, such as wind speed). Accordingly, the virtual vehicle 705 will be displayed via the display device 136, which may assist the driver to adjust the steering angle to compensate.

In some examples, the risk prediction system 310 may apply a risk check (e.g., at step 358 described above) that includes estimating the future position of dynamic objects (e.g., other vehicles, pedestrians, animals, etc.) in the environment. For example, the virtual reconstruction of the environment 100 may include predicted trajectories (e.g., using any suitable trajectory prediction algorithm such as using machine learning techniques or extrapolation techniques) of all detected dynamic objects in the environment over a defined number of future timesteps. Additionally, the virtual reconstruction of the environment 100 may accurately and precisely include all detected static objects in the environment 100. Then a simulation of the vehicle 105 in the virtual reconstruction may be performed for each future timestep in order to determine whether there is a risk of collision or risk of being too close. In another example, object classification and detection may be performed (e.g., by the ADAS 340 or the risk prediction system 310) to identify the class of a detected object in the environment. Then, a predefined risk level may be identified for the classified object (e.g., by looking up the object class in a predefined dictionary of objects). For example, if the classified object is a static human, the risk level may be low; if the classified object is a walking human, the risk level may be high. For classified objects having a high risk level, the risk prediction system 310 may predicted a trajectory of the object over a defined number of future timesteps. Any suitable trajectory prediction algorithm (e.g., using machine learning techniques or extrapolation techniques) may be used to predict a trajectory of the object. Then, the risk prediction system 310 may apply one or more risk checks (e.g., a check for risk of collision or risk of being too close) as described above, taking into account the estimated future location of the dynamic object at each future timestep.

In some examples, even if the risk prediction system 310 does not predict a risk of collision or risk of being too close to a dynamic object, the risk prediction system 310 may still flag the dynamic object as being a risk (since a dynamic object may move erratically). This information may be provided to the AR renderer 320, which may render a virtual indicator to indicate the dynamic object (e.g., a virtual bounding box around the dynamic object), to draw the driver's attention to the potential risk posed by the dynamic object.

In some examples, if the vehicle 105 is capable of vehicle-to-vehicle (V2V) communications or is otherwise capable of receiving data indicating the planned trajectory of other vehicles in the environment 100 (e.g., received via vehicle-to-infrastructure (V2I) communications), the risk prediction system 310 may apply a risk check (e.g., at step 358 described above) that takes into account the planned trajectory of other vehicles in the environment 100. V2V or V2I (or more generally vehicle-to-everything (V2X)) communications may take place where vehicles are fully-autonomous, semi-autonomous or fully human-driven. Through V2X communications, the risk prediction system 310 can receive data about the motions of another vehicle in the environment (e.g., behavior decision, planned trajectory, current vehicle state, etc.), which the risk prediction system 310 may use to check if there is any predicted risk with respect to the other vehicle within the predefined number of future timesteps. For example, if the other vehicle has a planned trajectory that includes a lane change into the lane of the vehicle 105, the risk prediction system 310 may predict a risk of collision if the vehicle 105 is currently accelerating. The AR renderer 320 may render the virtual vehicle to indicate the predicted risk. In some examples, the AR renderer 320 may include a virtual representation of the planned future trajectory of the other vehicle in the AR feedback, so that the driver understands the risk posed by the other vehicle attempting a lane change. Other such applications may be possible.

In some examples, the vehicle 105 may be an autonomous vehicle operating in a fully-autonomous mode. During fully-autonomous operations, the vehicle 105 may be controlled by an autonomous agent (which may be a machine learning-based system) implemented using the vehicle control system 115 (e.g., using the planning system 330).

The AR feedback including the virtual vehicle may be displayed in the display device 136 any time the human driver takes over control of the vehicle 105. For example, if the risk prediction system 310 predicts a risk at a future timestep and the autonomous agent is not able to generate a planned motion to avert the risk, or the risk is one that is categorized as requiring human input (e.g., in accordance with local laws, or in accordance with industry standards), the vehicle control system 115 may generate output (e.g., audio, visual and/or haptic output) requesting the driver to take over control. Additionally, the risk prediction system 310 and the AR renderer 320 may perform operations, as described above, to display the virtual vehicle via the display device 136, which may help the human driver to more smoothly take over control and understand the risky scenario.

In some examples, the virtual vehicle may be displayed via the display device 136 any time that a human driver requests to take back control from the autonomous agent (i.e., changing from fully-autonomous mode to semi-autonomous or fully human-driven mode), even if there is no risk predicted. Displaying the virtual vehicle in this manner may help the human driver to more smoothly take over control of the vehicle 105.

In some examples, the virtual vehicle may be displayed via the display device 136 even if there is no risk predicted, regardless of whether the vehicle 105 is operating in fully-autonomous, semi-autonomous or fully human-driven mode. For example, there may be a selectable option to always display the virtual vehicle whenever the vehicle 105 is operating in fully-autonomous mode. By displaying the virtual vehicle even during normal (i.e., non-risky) scenarios, a human passenger may be provided with assurance that the autonomous agent is controlling the vehicle 105 in a safe manner. In another example, a driver may be provided a selection option to display the virtual vehicle any time during operation of the vehicle 105, regardless of the mode of operation of the vehicle 105. Displaying the virtual vehicle during fully human-driven mode may be useful to provide feedback to a novice driver, for example.

In some examples, the AR feedback including the virtual vehicle may be generated and outputted for display via the display device 136 using the method 250, or using steps 352, 356 and 362 of the method 350 described above. In other words, the risk prediction system 320 and AR renderer 320 may operate to provide the virtual vehicle as AR driver assistance even when no risk is predicted. In the above examples, if the virtual vehicle is displayed and there is no risk predicted, the AR renderer 320 may render the virtual vehicle at a future timestep and projected distance that is dependent on the current speed of the vehicle 105, as described above.

In various examples, the present disclosure has described systems and methods for providing prediction-based AR feedback via a display device, such as a HUD, a dashboard display or a wearable device (e.g., a HMD or smartglasses). In particular, the AR feedback includes a virtual vehicle that represents a predicted future state of the vehicle and that is updated in real-time (or near real-time) to reflect changes in vehicle control. Visual AR feedback including a virtual vehicle, and provided via a display device, may enable a driver to intuitively understand a predicted risky scenario and to respond more quickly to avert the risk.

Examples of the present disclosure may be used to complement and augment the driver assistance provided by existing ADAS technologies. Examples of the present disclosure may be implemented using existing sensor technologies (e.g., including existing camera, LIDAR, radar, and ultrasound technologies, and existing technologies for fusing of such sensor data).

Examples of the present disclosure enables prediction of risk for a vehicle in a real-world environment, where the risk may be predicted based on performing a simulation of the vehicle in a virtual reconstruction of the environment. In particular, by fusing sensor data from different sensor modalities together with satellite data and pre-stored HD map data, a detailed and realistic reconstruction of the environment may be generated. The virtual reconstruction may be used to perform simulations that is accurate on a physics level, using a physics engine for example.

The present disclosure has described examples in which the AR feedback is displayed by a display device. It should be understood that the AR feedback may be displayed using various display devices. For example, a dashboard display may be used to display the AR feedback (e.g., by displaying the virtual vehicle and any virtual objects overlaid on a real camera image). In another example, a wearable device (e.g., a HMD or smartglasses) may be used to display the AR feedback (e.g., including tracking the position of the wearer's head so that the virtual vehicle can be positioned appropriate in the wearer's field of view). In another example, a HUD unit of the vehicle may be used to display the AR feedback by projecting the virtual vehicle and any virtual objects onto the windshield.

In some examples, the AR feedback that is provided may be tailored to the type of risk predicted (e.g., risk of being too close to an object, risk of collision, risk of rear-ending another vehicle, etc.). The AR feedback including a virtual vehicle that represents a predicted future state of the vehicle may present a more intuitive feedback (and hence reduced cognitive load) to the driver, compared to abstract symbol and text based AR visualizations.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method comprising:
   obtaining a current vehicle state of a vehicle at a current timestep and an environment map representing an environment of the vehicle at least at the current timestep;
   generating augmented reality feedback including a virtual vehicle representing a predicted future vehicle state, wherein the predicted future vehicle state is predicted for a given future timestep based on at least one of the current vehicle state or the environment map, wherein generating the augmented reality feedback includes:
   generating, for each one or more future timesteps, a respective predicted future vehicle state based on the current vehicle state;
   determining a predicted risk at the given future timestep by applying a defined risk check to the predicted future vehicle state corresponding to the given future timestep, wherein applying the defined risk check includes:
   computing a future trajectory of the vehicle from the given future timestep to a next future timestep; and
   determining that the vehicle traveling over the future trajectory intersects or abuts a detected object in the environment; and
   wherein the augmented reality feedback is generated responsive to determining the predicted risk; and
   outputting the generated augmented reality feedback including the virtual vehicle to be displayed by a display device.

2. The method of claim 1, wherein determining the predicted risk at the given future timestep by applying the defined risk check further comprises:
   determining that the predicted future vehicle state corresponding to the given future timestep indicates a predicted vehicle location is within a defined distance threshold from the detected object in the environment.

3. The method of claim 2, wherein the detected object is a dynamic object in the environment, wherein the predicted vehicle location is determined to be within a defined distance threshold from the dynamic object based on a predicted trajectory of the dynamic object, and wherein generating the augmented reality feedback comprises:
generating a virtual object representing the dynamic object, the virtual object being generated to be displayed in accordance with the predicted trajectory of the dynamic object.

4. The method of claim 3, wherein the dynamic object is another vehicle in the environment, and wherein the virtual object is another virtual vehicle representing the other vehicle.

5. The method of claim 1, wherein the detected object is a dynamic object in the environment, and wherein the vehicle traveling over the future trajectory is determined to intersect or abut the dynamic object based on a predicted trajectory of the dynamic object, and wherein generating the augmented reality feedback comprises:
generating a virtual object representing the dynamic object, the virtual object being generated to be displayed in accordance with the predicted trajectory of the dynamic object.

6. The method of claim 5, wherein the dynamic object is another vehicle in the environment, and wherein the virtual object is another virtual vehicle representing the other vehicle.

7. The method of claim 1, wherein determining the predicted risk at the given future timestep by applying the defined risk check further comprises at least one of:
determining that a yaw rate of the predicted future vehicle state corresponding to the given future timestep is different from a predicted trajectory heading rate, and a gradient of a yaw angle of the predicted future vehicle state corresponding to the given future timestep is different from a gradient of a steering angle of the predicted future vehicle state corresponding to the given future timestep; or
determining that a linear speed of the predicted future vehicle state corresponding to the given future timestep is greater than a defined speed threshold.

8. The method of claim 1, wherein generating the augmented reality feedback comprises:
generating a virtual object indicating the predicted risk, the virtual object being generated to be displayed relative to the virtual vehicle.

9. The method of claim 1, wherein generating the augmented reality feedback comprises:
further determining the predicted risk based on detecting activation of a safety system of the vehicle.

10. The method of claim 1, wherein the augmented reality feedback is ended responsive to determining that the predicted risk has been averted.

11. The method of claim 1, further comprising:
obtaining an updated vehicle state at a next current timestep or an updated vehicle control signal at a next current timestep;
updating the virtual vehicle representing an updated predicted future vehicle state, based on the updated vehicle state or the updated vehicle control signal; and
outputting the generated augmented reality feedback including the updated virtual vehicle to be displayed by the display device.

12. The method of claim 1, wherein the given future timestep is selected based on a current speed of the vehicle included in the current vehicle state.

13. The method of claim 1, wherein the display device is a head-up display of the vehicle.

14. A vehicle control system of a vehicle, the vehicle control system comprising:
a processing system; and
a memory storing instructions executable by the processing system to cause the vehicle control system to:
obtain a current vehicle state of the vehicle at a current timestep and an environment map representing an environment of the vehicle at least at the current timestep;
generate augmented reality feedback including a virtual vehicle representing a predicted future vehicle state, wherein the predicted future vehicle state is predicted for a given future timestep based on at least one of the current vehicle state or the environment map, wherein generating the augmented reality feedback includes:
generating, for each one or more future timesteps, a respective predicted future vehicle state based on the current vehicle state;
determining a predicted risk at the given future timestep by applying a defined risk check to the predicted future vehicle state corresponding to the given future timestep, wherein applying the defined risk check includes:
computing a future trajectory of the vehicle from the given future timestep to a next future timestep; and
determining that the vehicle traveling over the future trajectory intersects or abuts a detected object in the environment; and
wherein the augmented reality feedback is generated responsive to determining the predicted risk; and
output the generated augmented reality feedback including the virtual vehicle to be displayed by a display device.

15. The vehicle control system of claim 14, wherein the instructions further cause the vehicle control system to determine the predicted risk at the given future timestep by applying the defined risk check by:
determining that the predicted future vehicle state corresponding to the given future timestep indicates a predicted vehicle location is within a defined distance threshold from the detected object in the environment.

16. The vehicle control system of claim 15, wherein the detected object is a dynamic object in the environment, and wherein the predicted vehicle location is determined to be within a defined distance threshold from the dynamic object based on a predicted trajectory of the dynamic object, and wherein the instructions further cause the vehicle control system to generate the augmented reality feedback by:
generating a virtual object representing the dynamic object, the virtual object being generated to be displayed in accordance with the predicted trajectory of the dynamic object.

17. The vehicle control system of claim 14, wherein the detected object is a dynamic object in the environment, and wherein the vehicle traveling over the future trajectory is determined to intersect or abut the dynamic object based on a predicted trajectory of the dynamic object, and wherein the instructions further cause the vehicle control system to generate the augmented reality feedback by:
generating a virtual object representing the dynamic object, the virtual object being generated to be displayed in accordance with the predicted trajectory of the dynamic object.

18. The vehicle control system of claim 14, wherein the instructions further cause the vehicle control system to determine the predicted risk at the given future timestep by applying the defined risk check by:
- determining that a yaw rate of the predicted future vehicle state corresponding to the given future timestep is different from a predicted trajectory heading rate, and a gradient of a yaw angle of the predicted future vehicle state corresponding to the given future timestep is different from a gradient of a steering angle of the predicted future vehicle state corresponding to the given future timestep; or
- determining that a linear speed of the predicted future vehicle state corresponding to the given future timestep is greater than a defined speed threshold, wherein the defined speed threshold is defined based on the environment map.

19. The vehicle control system of claim 14, wherein the instructions further cause the vehicle control system to:
- obtain an updated vehicle state at a next current timestep or an updated vehicle control signal at a next current timestep;
- update the virtual vehicle representing an updated predicted future vehicle state, based on the updated vehicle state or the updated vehicle control signal; and
- output the generated augmented reality feedback including the updated virtual vehicle to be displayed by the display device.

20. The vehicle control system of claim 17, wherein the dynamic object is another vehicle in the environment, and wherein the virtual object is another virtual vehicle representing the other vehicle.

21. The vehicle control system of claim 14, wherein the instructions further cause the vehicle control system to generate the augmented reality feedback by:
- generating a virtual object indicating the predicted risk, the virtual object being generated to be displayed relative to the virtual vehicle.

22. The vehicle control system of claim 14, wherein the instructions further cause the vehicle control system to generate the augmented reality feedback by:
- further determining the predicted risk based on detecting activation of a safety system of the vehicle.

23. The vehicle control system of claim 14, wherein the augmented reality feedback is ended responsive to determining that the predicted risk has been averted.

24. A non-transitory computer readable medium having instructions encoded thereon, wherein the instructions, when executed by a processing system, cause the system to:
- obtain a current vehicle state of the vehicle at a current timestep and an environment map representing an environment of the vehicle at least at the current timestep;
- generate augmented reality feedback including a virtual vehicle representing a predicted future vehicle state, wherein the predicted future vehicle state is predicted for a given future timestep based on at least one of the current vehicle state or the current environment map, wherein generating the augmented reality feedback includes:
  - generating, for each one or more future timesteps, a respective predicted future vehicle state based on the current vehicle state;
  - determining a predicted risk at the given future timestep by applying a defined risk check to the predicted future vehicle state corresponding to the given future timestep, wherein applying the defined risk check includes:
    - computing a future trajectory of the vehicle from the given future timestep to a next future timestep; and
    - determining that the vehicle traveling over the future trajectory intersects or abuts a detected object in the environment; and
  - wherein the augmented reality feedback is generated responsive to determining the predicted risk; and
- output the generated augmented reality feedback including the virtual vehicle to be displayed by a display device.

* * * * *